United States Patent [19]

Cosgrove et al.

[11] Patent Number: 5,596,415
[45] Date of Patent: Jan. 21, 1997

[54] ITERATIVE PREDICTOR-BASED DETECTION OF IMAGE FRAME LOCATIONS

[75] Inventors: Patrick A. Cosgrove, Honeoye Falls; John Mitch, Webster; Mark Niedzielski, Fairport, all of N.Y.

[73] Assignee: Eastman Kodak Company, Rochester, N.Y.

[21] Appl. No.: 76,523

[22] Filed: Jun. 14, 1993

[51] Int. Cl.⁶ .............................. B41J 2/47; G03B 27/52; H04N 1/21; H04N 1/23
[52] U.S. Cl. .............................. 358/296; 355/40; 347/225
[58] Field of Search ..................... 358/296, 302; 355/41, 38, 68, 40, 77; 382/17, 22, 121, 127

[56] References Cited

U.S. PATENT DOCUMENTS

| | | | |
|---|---|---|---|
| 4,947,205 | 8/1990 | Benker et al. | 355/41 |
| 5,157,482 | 10/1992 | Cosgrove | 355/41 |
| 5,260,740 | 11/1993 | Seto | 355/41 |
| 5,337,164 | 8/1994 | Yabe | 358/487 |

FOREIGN PATENT DOCUMENTS

| | | | |
|---|---|---|---|
| 3511138 | 10/1985 | Germany | 355/40 |
| 0255931 | 11/1987 | Japan | 355/40 |

*Primary Examiner*—Benjamin R. Fuller
*Assistant Examiner*—Raquel Yvette Gordon
*Attorney, Agent, or Firm*—Charles E. Wands

[57] ABSTRACT

Locations of respective image frames contained on an image recording, such as a continuous color photographic film strip scanned by digitizing opto-electronic scanner are identified by storing scanline data produced by the scanner in a digital database, and processing the stored scanline data in accordance with set of image frame identification operators, which iteratively identify locations of nominally valid frames, beginning with the identification of all well formed frames. Each well formed frame has prescribed image frame attributes including at least a spatial region of image modulance bounded by leading and trailing edges adjacent to Dmin interframe gaps. The iterative identification procedure includes 'chopping' less than well formed frames, sorting frame regions based upon geometry considerations and identifying and adjusting the size of oversized and undersize frames. To reduce computational complexity a set of image frame-based 'predictors' and an associated set of thresholds are used in the iterative search and sort process.

73 Claims, 14 Drawing Sheets

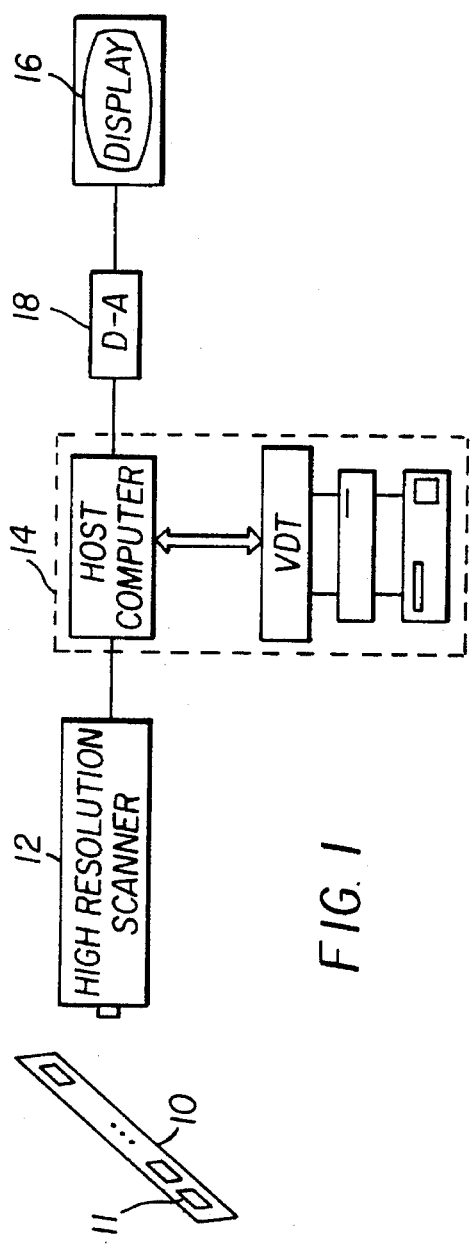
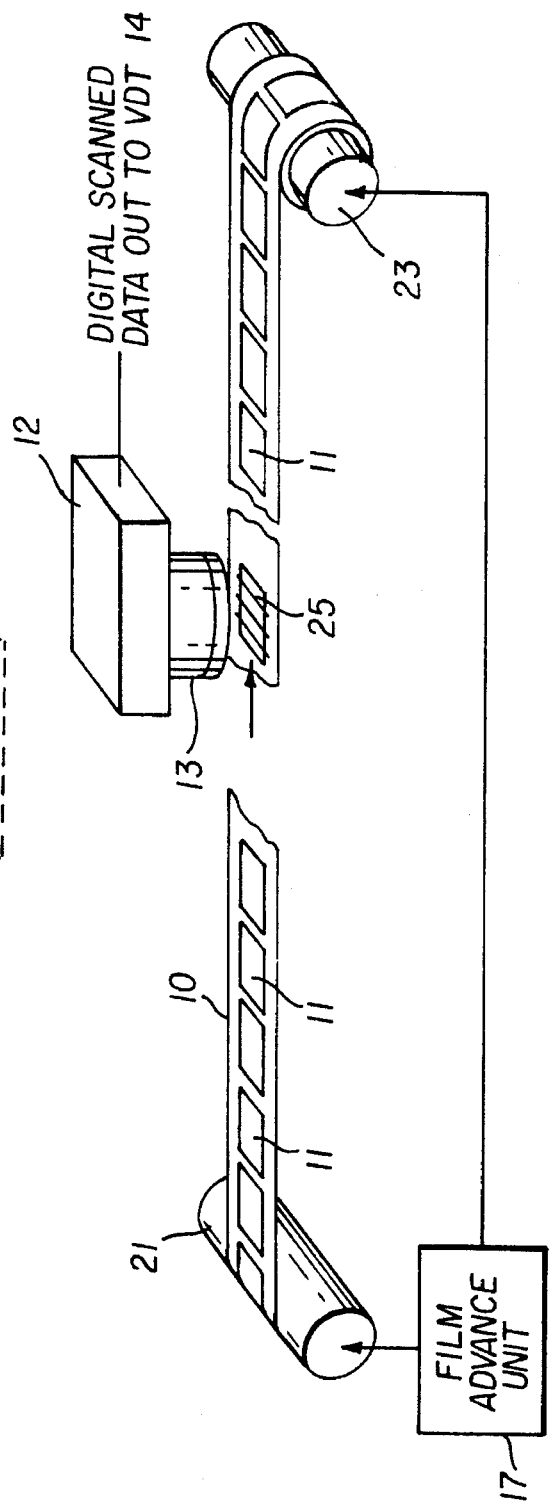
FIG. 1
FIG. 2

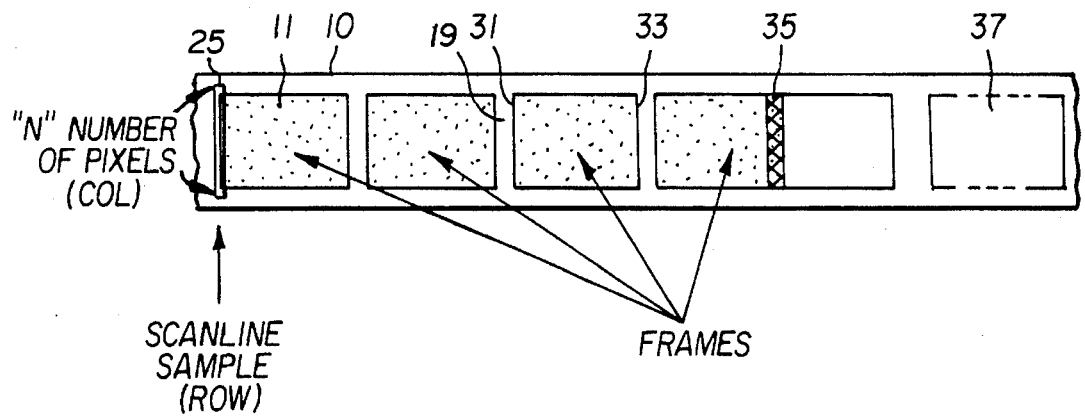
FIG. 3
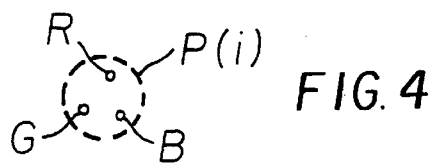
FIG. 4
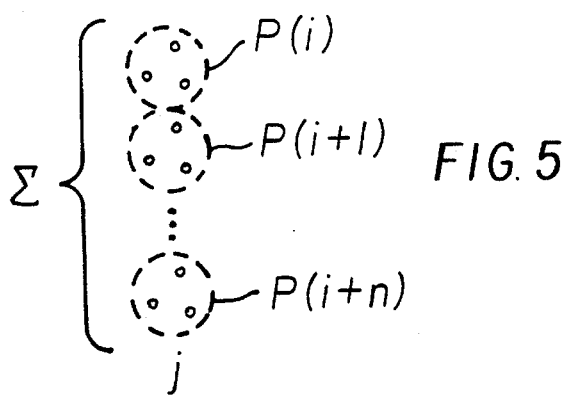
FIG. 5
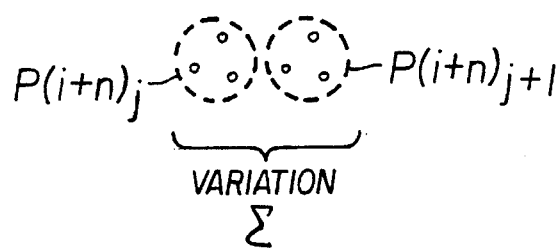
FIG. 6

- 101 — Eliminate any open gate scanlines at the beginning and end of the film order
- 103 — Create the Predictor arrays:
  - Allocate the memory for the statistical predictors array
  - Generate the stat predictors
  - 105 — If positive film, normalize stat predictor by inverting the data
  - 107 — Else it's negative film, generate stat predictor in normal fashion
  - Allocate the memory for the Delta arrays
  - 111 — Generate the Next Delta predictor
  - Generate the Previous Delta predictor
- 113 — Install the defaults for uninitialized configuration settings
- Determine which scanlines should not be included in the generation of the histogram
- 115 — Generate a histogram for each predictor set
- 117 — Determine each adaptive threshold based on the configuration and histograms

*FIG. 10*

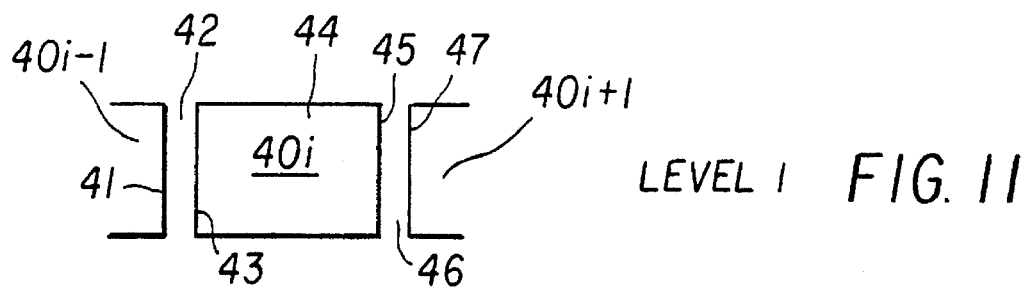
LEVEL 1   FIG. 11
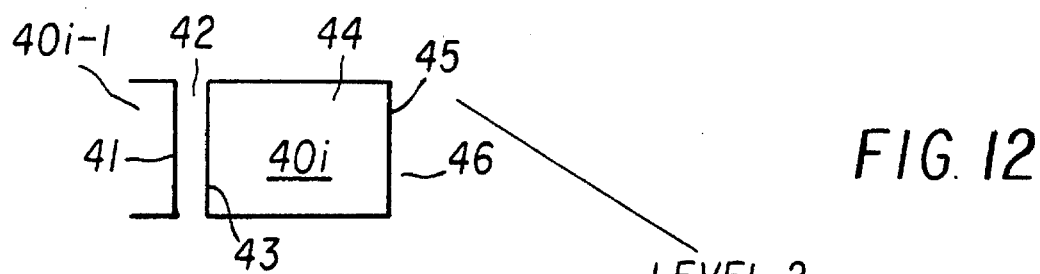
FIG. 12
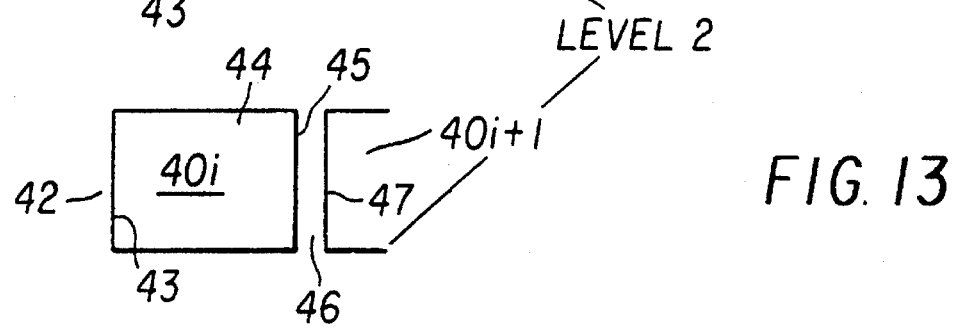
LEVEL 2
FIG. 13
LEVEL 3   FIG. 14
LEADING EDGE   TRAILING EDGE

*Perform Phase I Frame Detection:*
201 — [*Initialize the starting point to the beginning of the film order*
*Establish "Level 1" frame criteria*]

*Find Well Formed Frame Routine (Level 1):*

203 — [*Establish search windows based on nominal*
205 — [*Find the next Trailing edge ((Next Delta Predictor>Delta Threshold) and (next scanline Sum<Dmin Threshold)) within the search window*
207 — [*If a Trailing edge was found then,*
*from this point, find the next Leading edge ((Previous Delta Predictor>Delta Threshold) and (current scanline Sum<Dmin Threshold)) within the "gap" search window*
209 — [*If a Leading edge was found then,*
*If all scanline Sum predictors between the Trailing edge and Leading edge were at Gap densities (Sum<Dmin Threshold) then,*
211 — [*Find the next Trailing edge within the "frame" search window*
*If a trailing edge was found then,*
213 — *From this point, find the next Leading edge within the "gap" search window*
215 — [*If a Leading edge was found then*
*If all scanline Sum predictors between the Trailing edge and Leading edge were at Gap densities, a*
217 — [*Well formed Frame was found.*]

FIG. 15

Find Well Formed Frame Routine (Level 2):

301 — Establish search windows based on nominal
303 — Find the next Trailing edge ((Next Delta Predictor>Delta Threshold) and (next scanline Sum<Dmin Threshold)) within the search window
    If a Trailing edge was found then,
305 — From this point, find the next Leading edge ((Previous Delta Predictor>Delta Threshold) and (current scanline Sum<Dmin Threshold)) within the "gap" search window
    If a Leading edge was found then,
307 — If all scanline Sum predictors between the Trailing edge and Leading edge are at Gap densities (Sum<Dmin Threshold) then,
309 — Find the next Trailing edge within the "frame" search window
    If a trailing edge was found then,
311 — Well formed Frame was found.

321 — Else If a Leading edge was found then,
323 — If the scanline Sum predictor prior to the Leading edge was at Gap density
325 — (Sum<Dmin Threshold) then,
327 — Find the next Trailing edge within the "frame" search window
    If a trailing edge was found then, 331 — From this point, find the next Leading edge within the "gap" search window
    If a Leading edge was found then
    If all scanline Sum predictors between the Trailing edge and Leading edge were at Gap densities, then
333 — a Well formed Frame was found.

FIG. 16

Find Well Formed Frame Routine (Level 3):

401 — Establish search windows based on nominal
403 — Find the next Leading edge ((Previous Delta Predictor>delta Threshold) and (current scanline Sum<Dmin Threshold)) within the search window
If a Leading edge was found then,
405 — Find the next Trailing edge ((Next Delta Predictor>Delta Threshold) and (next scanline Sum<Dmin Threshold)) within the "frame" search window
If a trailing edge was found then,
407 — Well formed Frame was found.

FIG. 17

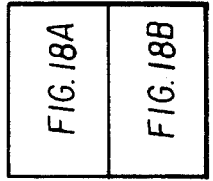

FIG. 18A

- After finding a well formed frame, Chop Frames routine.

501 — • If a Lead edge is detected (within an appropriate span of scanlines),

503 — • Then a window of scanlines at a typical distance away from the leading edge is searched for a Trailing edge.

505 — • If a Trailing edge is detected,
- Then the region is denoted as a frame and the next region is tested.

507 — • If a trailing edge wasn't detected but the scanlines exhibited Dmin-like properties, 509 — • Allow the region to be denoted as a frame (assuming that the frame on this side was sufficiently underexposed) and test the next region.

511 — • If neither a trailing edge nor Dmin was observed within the assumed window,
- Then nothing at this time can be deduced regarding this frame. Label this region as Ambiguous and terminate further frame chop processing.

521 — • If a Lead edge is not detected but the scanlines exhibited Dmin-like properties,

- Then assume this frame was sufficiently underexposed on this side.

523 — • If a Trailing edge is detected (within an appropriate span of scanlines), 525 — • Then allow the region to be denoted as a frame and test the next region.

• If a trailing edge was not detected,

527 — • Then nothing at this time can be deduced regarding this frame. Label this region as Ambiguous and terminate further frame chop processing.

• If a Lead edge is not detected and the span scanlines did not exhibit Dmin-like properties,

• Then label this region as Ambiguous and terminate further frame chop processing.

529 — • After finding the last available frame to "chop", return to find the next Well Formed Frame of the film order.

FIG. 18B

*Region size less than twice maximum frame size but larger than maximum frame size*

If
    RegionSize < (2 x FrameMaxSize) and
    RegionSize >= (1.5 x FrameMaxSize)

then
    label region overlap25

If
    RegionSize < (1.5 x FrameMaxSize) and
    RegionSize >= (1.25 x FrameMaxSize)

then
    label region overlap50

If
    RegionSize < (1.25 x FrameMaxSize) and
    RegionSize > (FrameMaxSize)

then
    label region overlap75

ITERATIVE PREDICTOR-BASED DETECTION OF IMAGE FRAME LOCATIONS

FIELD OF THE INVENTION

The present invention relates to image processing systems and is particularly directed to a frame detection mechanism for locating the positions of respective images.

BACKGROUND OF THE INVENTION

Automated photographic film handling processes, such as film scanning and printing processes, require the ability to accurately position the film at the location of each exposure (image frame). For example, photofinishing systems customarily prescan a strip of (35 mm) color film to examine the quality and color content of the respective image frames prior to transferring the images to print paper. On the basis of this prescan examination, exposure control parameters of the scanning optics components are defined so that, during a second pass of the film, the projection of each image onto the print medium will be properly adjusted to yield an acceptable quality hard copy print.

In order to accurately identify where each image is located, it is conventional practice to form respective notches along the edge of the film, for example between successive frames, or centrally of each frame. When the film is rescanned, these notches are used to identify successive frames for scanning of optical printing. A shortcoming of such a control procedure is the fact that a notch is sometimes missed or mislocated. When this happens, a mismatch between the current image frame and prescan-derived exposure control parameters can occur. The result is a poor quality set of prints, making it necessary for the photofinisher to reprocess the film strip, which entails additional time, and costs associated with the wasted print materials. Although a minor lag in processing can be adequately managed, when a large reel of film is to be scanned continuously on a single machine and then printed on the same (or other) machine, it is too complex to track and detect possible sequence errors.

One attempt to remedy this notch misalignment problem, described in the U.S. Patent to Benker et al, U.S. Pat. No. 4,947,205, is to make use of the film density change occurring at interframe gaps between successive image frames. In accordance with the system described in the '205 patent, film density change measurements are conducted in order to compensate for 'slippage' between the film strip transport reels and the film strip itself. A counter is operative, in conjunction with film transport notches along the sides of the length of the film, to provide an indication of film advance, and it is assumed that well formed image frames are properly spaced apart by periodically spaced (Dmin) interframe gaps. When the film strip is rewound in preparation for a rescan, the output of a film density monitoring circuit, which looks for interframe gaps, is compared with the notch counter. If the two do not coincide, then it is inferred that slippage has occurred and the position of the film is adjusted to compensate for the difference.

Unfortunately, it is not always the case that successive images on a continuous film strip are equally spaced apart from one another, nor is it always the case the content of an image frame immediately adjacent to an interframe gap is at a signal modulance level different from Dmin. Indeed, it often occurs that two or more image frames on a film strip to be processed overlap each other (a condition that may occur if the film has been rewound by the camera user, for example). Also, the captured image (modulance) contents of an image frame may be such that the modulance cannot be distinguished from non-exposed (interframe-gap) portions of the film (for example, a night-time fireworks image, where the principal portion of the image frame surrounding the fireworks display is effectively in darkness). In this latter case, the interframe gap and the image frame itself effectively blend together.

SUMMARY OF THE INVENTION

In accordance with the present invention, rather than initially assume that all images are well defined and periodically separated from one another by equally sized interframe gaps, (as in the 'slippage' detection mechanism described in the '205 patent,) the present invention makes no a priori assumption as to where images are located or how many images may be contained on the film strip. Instead, the invention examines the entirety of the contents of the film strip to accurately identify the location of every 'nominally whole' image frame that is capable of being successfully processed into an output digital image. From the identification process, a list of address space pointers is produced, the address pointers pointing to where, within the digitized film strip database, all of the image frames, that are contained on said film strip and have been determined to be capable of producing acceptable images for processing by the digital image processing system into acceptable nominal output images such as for storage on a Photo CD, are located. Since the respective scanlines produced by the film scanner are associated with physical locations on the film, the scan controller uses the pointers produced by the frame detection mechanism to control the operation of the film scanner during the high spatial resolution rescan, so as to precisely align the operation of the film gate with successive image frame-containing locations on the film.

Although it is possible to operate directly upon the pixel data associated with each successive scanline, the present invention transforms the pixel data for respective scanlines into a set of 'predictors', which are associated with image frame parameters that more directly represent those attributes of an image frame necessary in order to conclude where, on the film strip, valid image frames are located. By using predictors, rather than the raw digital data, a considerable savings in processing time and a reduction in computational complexity are realized. Associated with the predictors is a set of thresholds with respect to which predictor comparisons are performed.

The thresholds are limits that aid in detecting and defining the properties of image frames within a given filmstrip data base. There are two classes of thresholds: adaptive and non-adaptive. The adaptive thresholds are dependent upon actual scanline data within the film scan order and allow the frame detection mechanism to adjust itself to variations in characteristics of the exposed film. The nonadaptive thresholds are independent of the scanline data, and have been empirically determined to not change the effectiveness of the frame detection mechanism.

The frame detection mechanism in accordance with the present invention involves an iterative search process through the digitized image database resulting from the scanning of the continuous image captured medium (film strip), beginning with a phase I search for 'well formed' frames, namely regions of the film strip that possess prescribed image content and frame boundary parameters, which permits such regions to be readily identified with a desired 'nominally whole image frame'.

After system initialization, the phase I search is carried out to locate respective ones of a first category (level 1) of well formed frames that has the highest degree of certainty to be a complete image frame. This best well formed frame consists of a trailing edge (of a previous image frame), a first interframe gap, a leading edge (of the well formed frame of interest), image modulation, a trailing edge, a second interframe gap, and another leading edge (of the next frame).

A second category (level 2) of well formed frames includes those frames that substantially correspond to a 'level 1' frame, but lack either an initial trailing edge preceding the image frame of interest, or a final leading edge that follows the image frame of interest. A third category (level 3) of well formed frame consists of a first gap, a leading edge, an image modulation, a trailing edge, and a second gap.

During the phase I search for a well formed frame, in addition to requiring that each of the three levels of well formed frames have at least a first gap, a leading edge, frame image data, a trailing edge and a second gap, the relative spacings between each successive attribute must conform with prescribed standards (associated with given film types). During phase I, the iterative search process begins at level 1 and proceeds through level 3, until it has exhausted the entire film order at the current level of search.

In the course of a search for a well formed image frame, whenever a well formed image frame (associated with that particular level of search) is found, it is inferred that the located well formed frame is preceded or succeeded by one or more additional valid image frames, in order that the locations of such additional valid frames may be expeditiously determined without employing the relatively rigorous search for well formed frames in these portions of the film order.

For this purpose, once a well formed frame has been located, a less stringent set of criteria is employed in a 'chop frames' routine, which is operative to identify additional valid or nominally whole image frames within the film strip data base. This less stringent criteria looks to determine whether, relative to an identified well formed frame, there are any succeeding or preceding frames that contain at least one edge. Whenever such additional valid frames are located, their locations are precisely located via database pointers, so that such frames may be removed or 'chopped' out of the scanline database and not considered during further steps of the iterative search process, to be described.

The image data processing operator employed by the chop frames routine requires that at least one edge of a frame be detected in order to continue finding frames without resorting to finding another well formed frame. The other edge of the frame may itself be detectable or must be considered to have a value corresponding to Dmin. (As noted earlier each frame edge (leading or trailing) has its value based upon Dmin.) For an ideal frame of a given nominal frame size, the leading edge of a frame is the first scanline of the frame containing signal encountered in the order in which successive images are examined, and must be preceded by a scanline associated an interframe gap. Conversely, the trailing edge of an ideal nominal frame is the last scanline of the frame containing signal encountered in the order in which successive images are examined, and must be succeeded by a scanline associated an interframe gap. Since, however, actual frames vary in size and, moreover, image frames output by the frameline detection process are prespecified to be slightly smaller than the frame size of a scanned image, in order to optimize the signal content of each image, image frame edges actually encompass several scanlines, rather than a single scanline.

The chop frames routine begins chopping frames in a 'forward' direction, i.e. frames that spatially succeed the well formed frame of interest, until it can no longer chop valid frames. It then returns to the starting point of the well formed frame of interest and chops frames that precede the well formed frame of interest, i.e. in a backward direction. It should be noted that in the chop frames routine to be described the leading and trailing edges occur in the direction of carrying out the process. Thus, for preceding frames in the backwards chop direction the leading edge and the trailing edges are reverse to those in the forward direction through succeeding frames.

When the valid frame chopping criteria are no longer satisfied, the process returns to looking for the next well formed frame for the search level of interest. Whenever a well formed frame is again found, the chop frames process is again initiated. In other words, the search for a well formed frame implies a follow-on chopping operation (to the extent possible). The search for well formed frames and the chopping of nominally valid frames continues until the entirety of the scanned film database has been processed in accordance with the phase I, search and chop procedure. At any instance during the phase I operation, where film image data represents a potential image frame, but one that does not satisfy phase I detection and extraction criteria, the film region of interest is labelled as an 'ambiguous' image frame, and is subjected to further processing, to be described.

Once Phase I processing has been completed, the sizes of the frames thus far identified are employed to establish a standard frame size and maximum and minimum frame size and gap size limits to be used in subsequent Phase II and Phase III processing. Namely, because the Phase I search looks for a number of spatial components of a frame, it is inferred that the parameters of frames detected in the Phase I search are typical of the sizes of all frames to be processed, and thereby can be used to establish valid limits on a less rigorous set of criteria through which those regions that have been labelled as 'ambiguous' according to phase I standards may be identified as nominally whole image frames during Phases II and III.

After completing phase I processing, the frame detection mechanism of the present invention proceeds to a phase II ('fitted image frame') procedure, which looks to see if any of the thus far 'ambiguous'-labelled portions of the film strip between chopped image frames has a spatial size that will allow a 'fitting' of an integral number of image frames, each of which has a size sufficient to accommodate an image frame region whose size is the average of that of a well formed frame detected in phase I, and which is bounded by a pair of interframe gaps whose dimensions are those of the interframe gaps of a well formed frame detected from phase I.

Namely, if the extent of a film region that has been labelled I as 'ambiguous' (as a result of Phase I processing) is sufficient to accommodate an integral number of image frames, then the potential image frame area is subdivided into a grid, respective cells of which correspond to the size of a 'standard size' image frame sufficient to accommodate an interior image modulation portion, bounded by a pair of interframe gap regions. In order to be identified as a valid frame, at least one scan line of the interior portion of a respective cell must contain image modulation of at least a prescribed threshold and each of its associated interframe gap regions must have a gap-like (Dmin) density characteristic. Each cell of a subdivided ambiguous film strip area that has satisfied these two requirements is labelled as a valid frame and its identification is added to the list of frames that identified as well formed frames and those chopped from the database during phase I processing. Any ambiguous portion of the film strip database that still remains after Phase II processing is next subjected to Phase III processing.

Upon completion of phase II processing, the frame detection mechanism of the present invention proceeds to a phase III (oversize, undersize sorting) procedure, which looks to see whether any of the still remaining 'ambiguous'-labelled portions of the film strip has a size sufficient to accommodate an image frame region and if the region contains modulance. If so, the region is classified according to its size and subjected to further processing based upon frame size classification.

If the size of the modulance-containing region is greater than or equal to a prescribed minimum frame size and is less than or equal to a prescribed maximum frame size, then the region is labelled as a nominally acceptable frame to be included on the valid frame list thus far assembled in phases I and II of the frame detection mechanism. On the other hand, if the size of the modulance-containing region is less than the minimum frame size, then the region is labelled as an 'undersized' frame and is subjected to undersize processing, so that, if possible, it may be combined with another undersized frame. If the size of the modulance-containing region is greater than maximum frame size, then the frame is 'oversized' and it is inferred than such an oversized frame is a combination of at least two frames, which needed to be subdivided into respective 'stand-alone' image frames.

A determination is made as to whether such an 'oversized' region is less than or equal to twice the maximum frame size. If the oversized region does not exceed twice the maximum frame, then it is inferred that the oversized region is a combination of only two images that overlap or abut one another. A dual region is labelled as a 'simple' overlap image frame, which is subjected to further processing in order to classify the degree or extent of overlap in preparation of further processing.

More particularly, the degree of overlap is defined as one of three categories: "overlap 25", where the region size is less than twice the maximum frame size but greater than or equal to 1.5 times maximum frame size, "overlap 50", where the region size is less than 1.5 times the maximum frame size but greater than or equal to 1.25 times maximum frame size, and "overlap 75", where the region size is less than 1.25 times the maximum frame size, but greater than or equal to maximum frame size.

If the size of the oversized modulance-containing region is greater than twice the maximum frame size, then it is inferred that more than two images overlap one another. In this case the oversized region is labelled as a 'multiple' overlap image frame, which is subjected to an edge-excision procedure that extracts a pair of images from each of the leading edge and the trailing edge of the oversized image region. Each of the excised regions is labelled to fall within the overlap 25 category. The residual portion of the oversized image remaining after the excision of overlap 25 regions is labelled as ambiguous and then further reduced, to the extent possible, from its leading and trailing edges into further excised regions. Namely, reduction of multiple oversized regions proceeds from the outside-in, from the leading and trailing edges, until the residual region is less than the maximum size of a nominal image frame. Such a residual image is denoted as ambiguous.

If the size of the modulance-containing region is less than the minimum frame size, then the region is labelled as an 'undersized' frame, and an attempt is made to combine the undersized region with another, adjacent undersized region. Namely, the undersized region of interest is merged with one or more successively adjacent undersized regions as long as the size of the resulting merged region is no greater than the maximum size of a nominal image frame. This process continues until it is determined that the resultant image frame will exceed maximum frame size. In this event, no further combining of undersized image frames with the frame of interest is conducted. If what remains is a single or plural non-combinable undersized images, such regions are labelled as ambiguous.

After all oversized frames have been reduced and labelled and all undersized frames have been combined and labelled, they are added to the list of valid image frames. All remaining regions within the film strip database are labelled as ambiguous frames and are excluded from the list of valid images frames. With a valid image frame list completed, the size of each image on the list is adjusted, as necessary, to conform with the size of a 'nominally whole' image frame, e.g. a 128 pixel×192 pixel image frame. This operation, referred to as 'tuning' of the image frame, serves to equate the size of each image with a prescribed base image size employed by the digital image processing system, in particular by the scene balance mechanism for deriving control information to be used for optimizing the manner in which a subsequently scanned high resolution digitized image is to be mapped into memory. As pointed out above, the result of such analysis is used to calibrate the sensitivity parameters of the film scanner during the high resolution scan, so that the essential subject matter of the image which is necessary to reproduce a high quality image will fall within the linear portion of the response range of the scanner's imaging pixel array.

Tuning of a respective image frame involves analyzing the size of a respective image to determine whether it matches the (128×192) size of a nominal image frame. If so there is no change. If the image is oversized, the size of the image is reduced or 'shrunk' to nominal. If the image is undersized, the size of the image is increased or 'grown' to nominal. Pursuant to the present invention, the variation between the contents of a frame's leading edge scanline and its adjacent image scanline is compared with the variation between the contents of the frame's trailing edge scanline and its adjacent image scanline. For that pair of scanlines whose variation is smallest, the outermost or 'edge' scanline is excised from the image frame, so as to reduce the size of the image frame by one scanline.

Where the variation between the contents of the leading edge scanline and its adjacent image scanline is larger than the variation between the contents of the trailing edge scanline and its adjacent image scanline, then the current trailing edge scanline is discarded from the image frame and its interior adjacent scanline becomes the new trailing edge of the image frame. This process is repeated, as necessary, until the total number of scanlines corresponds to that of a nominal image (e.g. 192 scanlines). Once the total number of scanlines matches that of a nominal image frame, no further adjustment in image frame size is performed and the image frame is considered to be tuned.

An undersized image is 'grown' by a similar iterative scanline addition sequence. To grow an image frame, the variation between the contents of the leading edge scanline and its adjacent image scanline outside of the undersized image frame is compared with the variation between the contents of the trailing edge scanline and its adjacent image scanline outside of the image frame. For that pair of scanlines whose variation is largest, the adjacent scanline outside of the image frame is added to the image frame, so as to increase the size of the image frame by one scanline. A caveat to this process is the requirement that the adjacent scanline to be added to the image frame cannot be part of an adjacent image frame. If one side of an under-sized frame has been expanded to the limit of its field of expansion (the scanline next to an adjacent frame), then the remaining expansion will occur on the opposite side of the frame. If this encroaches on an adjacent side, then the undersized image frame region is considered to be ambiguous and is labelled as such. As in the case of iteratively reducing the size of an oversized image, this process is repeated, as necessary, until the total number of scanlines corresponds to that of a nominal image frame (e.g. 192 scanlines). Once the total number of scanlines matches that of a nominally whole image frame, no further adjustment in image frame size is performed and the image frame is considered to be tuned.

ADVANTAGES

As discussed above, by utilizing the complete order, various statistics pertaining to the film order allows the algorithm to adapt to the characteristics of each film order which affects the ability to determine the location of the exposed frames of the order. This allows the frame detection algorithm to better contend with the varying frame lengths, varying film types, and varying film exposures.

By using non-monotonic reasoning the algorithm can iteratively determine more details about the film order through each phase of its analysis. This allows greater sensitivity, increasing its effectiveness in finding the edges of the exposed frames. Fewer frames are lost with this method thus improving yield and reducing the amount of manual intervention required.

Operating within the predictor space reduces the amount of data to be inspected during the frame line logic portion of the algorithm thus reducing the time required to perform the analysis.

Utilizing the "delta" predictors allows another form of adaptation by looking at the differences of adjoining scanlines. This also improves the sensitivity of the algorithm for detecting the edges of the exposed frames.

Allowing gap-like densities (Dmin) to be treated as edges of frames improves yield and mis-registered frames.

BRIEF DESCRIPTION OF THE DRAWINGS

FIG. 1 diagrammatically illustrates a digital image processing system for processing photographic color images, such as those captured on a continuous strip of color photographic film;

FIG. 2 diagrammatically illustrates the transport of a film strip in the course of its being scanned by the system of FIG. 1;

FIG. 3 diagrammatically illustrates the manner in which spatially separated scanlines traverse a film strip in a direction generally transverse to its transport direction past the scanner's imaging optics;

FIG. 4 diagrammatically illustrates a pixel triad P[i] that defines a respective scanline pixel [i] within an arbitrary scanline j, comprised of a red pixel R, a blue pixel B and a green pixel G;

FIG. 5 diagrammatically shows, for a scanline j, how the value SUM represents a the resultant neutral value obtained by summing the respective neutral values associated with each of the RGB triads P[i], P[i+1], . . . , P[i+n] of which scanline j is comprised;

FIG. 6 shows, for a scanline j, the value VARIATION representing the absolute value of the result of summing respective differences between RGB triads of adjacent scanlines, i.e. between P[i]of scanline j and P[i] of scanline j+1, through P[i+n] of scanline j and P[i+n] of scanline j+1;

FIG. 10 is a preliminary processing flow chart diagram in which scanned data processing parameters are initialized;

FIG. 1l diagrammatically illustrates the spatial components of a 'level 1' well formed frame;

FIG. 12 diagrammatically illustrates the spatial components of a first alternative of a 'level 2' well formed frame;

FIG. 13 diagrammatically illustrates the spatial components of a second alternative of a 'level 2' well formed frame;

FIG. 14 diagrammatically illustrates the spatial components of a 'level 3' well formed frame;

FIG. 15 shows a flow process for a level 1 search for a well formed frame;

FIG. 16 shows a flow process for a level 2 search for a well formed frame;

FIG. 17 shows a flow process for a level 3 search for a well formed frame;

FIG. 18 shows a flow process for a chop frame routine;

DETAILED DESCRIPTION

Figure 7:
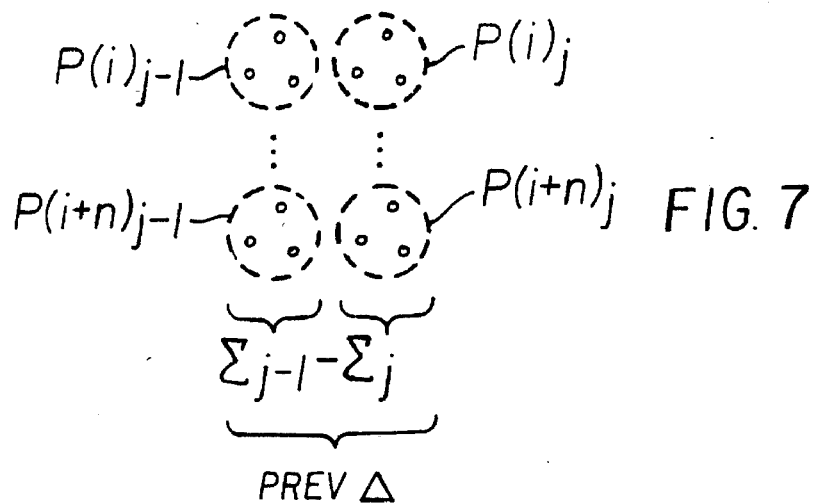
FIG. 7 diagrammatically illustrates the difference in sums for a PREVIOUS DELTA for a scanline j, as SUM[j]–SUM[j–1]

Before describing in detail the particular image frame detection in accordance with the present invention, it should be observed that the present invention resides primarily in what is effectively a prescribed augmentation of the image scanning control software employed by the control processor which operates the film scanning mechanism at the front end of a digital image processing system, and not in the details of the hardware employed to scan the film. Accordingly, the structure, control and arrangement of conventional components and signal processing circuitry of which such a system is comprised have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

FIG. 1 diagrammatically illustrates a digital image processing system (e.g. photofinishing minilab) for processing photographic color images, such as those captured on one or more strips of color photographic film by a still (e.g. 35 mm) camera, with which the present invention may be employed. For purposes of the present description, such a system may be of the type described in the U.S. Pat. No. 5,157,482, issued Oct. 20, 1992, entitled "Use of Pre-scanned Low Resolution Imagery Data for Synchronizing Application of Respective Scene Balance Mapping Mechanisms During High Resolution Rescan of Successive Images Frames on a Continuous Film Strip," by P. Cosgrove, assigned to the assignee of the present application and the disclosure of which is herein incorporated. It should be observed, however, that the digital image processing system described in the '482 patent is merely an example of one type of a highly automated digital image processing system, in which the image frame detection mechanism of the present invention may be used, and is not to be considered limitative of the invention. In general, the present invention may be incorporated in any digitized image processing and reproduction system, where detection of images that are spatially arranged in sequence on an image capture medium is required.

In the digital image processing system described in the '482 patent, successive image frames of a continuous reel of color photographic film, such as a spliced-together sequence of 35 mm film strips, are pre-scanned by a digitizing scanner at a low spatial resolution, in order to derive information for calibrating the operation of the scanner during a subsequent high spatial resolution scan. More particularly, each digitized low resolution image is initially processed by a scene balance mechanism for deriving control information to be used for optimizing the manner in which a subsequently scanned, high spatial resolution digitized image is to be mapped into memory. The output of this analysis is used to calibrate the sensitivity parameters of the scanner during the high spatial resolution scan, so that the essential subject matter of the image which is necessary to reproduce a high quality image will fall within the linear portion of the response range of the scanner's imaging pixel array. The high spatial resolution digitized image is then processed by the scene balance mechanism to map the image data into a digitized image having a reduced encoding resolution corresponding to that of an attendant framestore.

Each high spatial resolution digital image processed and output by the system is stored in a portable multi-image database, such as a photographic image-containing compact disc (Photo CD), in the form of a respective digital image data file containing a low, or base, spatial resolution image bit map file and a plurality of successively higher spatial resolution residual images associated with respectively increasing degrees of spatial resolution of the image. By iteratively combining these higher spatial resolution residual images with the base resolution image, successively increased spatial resolution images may be recovered from the base resolution image.

As an example, spatial data values representative of a high resolution (3072×2048) image scan of a 36 mm-by-24 mm image frame of a 35 mm film strip may be stored as a respective image data file, including a base resolution image bit map file containing data values associated with a spatial image array or matrix of 512 rows and 768 columns of pixels, and an associated set of residual image files to be stored on the compact disc.

Within the photofinishing workstation, the base resolution image may be further sub-sampled to derive an even lower resolution sub-array of image values (e.g. on the order of 128×192 pixels) for use by the photofinishing operator in the course of formatting and storing a digitized image file. For purposes of the present description, the spatial parameters of such a sub-sampled base image (i.e. 192 lines by 128 pixels per line) will be considered to be those of a respective 'nominally whole image frame', which the frame detection mechanism of the present invention is operative to extract from a sequence of image frames contained on a continuous film strip, which has been scanned, digitized and stored in a digital image database. In the digital image processing system of FIG. 1, color photographic images 11, such as a set of twenty-four or thirty-six 36 mm-by-24 mm image frames of a 35 mm color film strip 10, may be scanned by a high resolution opto-electronic color film scanner 12, such as a commercially available Eikonix Model 1435 scanner.

The transport of the film strip in the course of the scanning operation is diagrammatically illustrated in FIG. 2. As the film strip 10 is transported from a supply reel 21 to a take-up reel 23, under the control of a film advance unit 17, high resolution film scanner 12 outputs, to an attendant workstation 14, digitally encoded data representative of the response of its imaging sensor pixel array (e.g. a 2048×3072 pixel matrix) to the contents of film strip 10 as projected by an input imaging lens system 13.

The digitally encoded data is representative of the contents of spatially separated scanlines 25, each scanline traversing the film strip in a direction generally transverse to its transport direction past the scanner's imaging optics 13, so that each scanline 25 effectively extends 'across' the film strip 10, as shown in FIG. 3. Each scanline 25 has a prescribed spatial resolution (being comprised of a prescribed number of pixels (e.g. 128 pixels) as defined by the sensor parameters of the scanner 12) and is effectively representative of whatever scanner 12 sees as the film strip 10 is transported past the film gate of the scanner's projection optics 13.

As film strip 10 is advanced past the viewing optics 13 of scanner 12, the scanner outputs digital data representative of each scanline 25, encoded to a prescribed digital resolution for each of the (128) pixels in the scanline, and supplies the digital scanline data to processor 14 for storage in memory. It is this digital scanline data that is applied as the input to the frame detection mechanism of the present invention. The frame detection mechanism then analyzes the scanline data for an entire film strip, from beginning to end, and produces a list of pointers that identify where, within the digitized film strip database, as output by the scanner and currently resident in memory in the digital image workstation, all of the images frames are located. The frames are these it has determined contain valid image frame data, from which an acceptable 'nominally whole' image frame can be produced by the attendant digital image processing system (e.g. into a Photo CD image).

Because film-advance mechanisms for still cameras are customarily intended to operate such that they translate a loaded strip of film in a manner that causes successive image frames 11 to be spatially separated from one another by unexposed (Dmin) interframe gaps, diagrammatically illustrated at 19 in FIG. 3, the beginning (leading edge) 31 and the end (trailing edge) 33 of a frame may be identified by the locations of such gaps, so as to facilitate aligning successive frames on the film strip with the viewing optics of the scanner. Namely, a frame edge (leading or trailing) has its value based upon Dmin. As pointed out above, the film slippage compensation mechanism described in the U.S. Patent to Benker et al, U.S. Pat. No. 4,947,205, proposes employing interframe gaps for the purpose of film slippage compensation, and assumes that the captured image frames are well formed and properly spaced apart by such periodically spaced interframe gaps.

Unfortunately, because it is not always the case that successive images on a continuous film strip are equally spaced apart from one another, nor is it always the case that the content of an image frame immediately adjacent to an interframe gap is at a signal modulance level different from Dmin, the compensation mechanism of the Benker et al '205 is neither a complete, nor a predictably successful solution to the problem of accurately locating all image frames that may be contained on a film strip.

More particularly, it often occurs that two or more image frames on a film strip overlap each other (for example, if the film has been rewound by the camera user), as diagrammatically illustrated at 35 in FIG. 3. Also the captured image (modulance) contents of an image frame may be such that the modulance cannot be distinguished from non-exposed (interframe-gap) portions of the film (for example, a nighttime fireworks image, where the principal portion of the image frame surrounding the fireworks display is effectively in darkness). In this latter case, the interframe gap and the image frame itself effectively blend together, as shown at 37.

In each of these circumstances, just as in the ideal case of well formed images periodically separated by interframe gaps, the film strip contains image frames the locations of which must be accurately detected, if such frames are to be successfully extracted for application to the digital image processing system. Rather than operate on the basis of an assumed a priori ideal case that all images are well defined and periodically separated from one another by interframe gaps (as in the '205 patent), the present invention makes no a priori assumptions as to where images are located or how many images may be contained on the film strip. Instead, the invention examines the entirety of the contents of the film strip to locate and readily extract, to the extent possible, each and every image frame that is capable of being successfully processed into an output digital image for storage on a Photo CD by the digital image processing system, so as to maximize the productivity of the high resolution image scanning process.

As noted above, and as will be described in detail below, the frame detection mechanism of the present invention is operative to produce a list of address space pointers which point to where, within the digitized film strip database, all of the image frames, that are contained on said film strip and have been determined to be capable of producing acceptable images for processing by the digital image processing system into acceptable nominal output images for storage on a Photo CD, are located. Since the respective scanlines produced by the film scanner are associated with physical locations on the film, the scan controller uses the pointers produced by the frame detection mechanism to control the operation of the film scanner during the high spatial resolution rescan, so as to precisely align the operation of the film gate with successive image frame-containing locations on the film.

As stated earlier, the input to the frame detection mechanism of the present invention is the digitized pixel data for each line output by scanner 12 and stored in memory resident in workstation 14. Although it is possible to operate directly upon the pixel data associated with each successive scanline, the present invention transforms the pixel data for respective scanlines into a set of 'predictors', listed below, which are associated with image frame parameters that more directly represent those attributes of an image frame necessary in order to conclude where, on the film strip, valid image frames are located. By using predictors, rather than the raw digital data, a considerable savings in processing time and a reduction in computational complexity are realized. Associated with the predictors is a set of thresholds with respect to which predictor comparisons are performed.

PREDICTORS

NEUTRAL: represents the density of a respective scanline pixel [i] and is denoted as:

NEUTRAL [i]={Red Pixel [i]+Green Pixel [i]+Blue Pixel [i]}

FIG. 4 diagrammatically illustrates a pixel triad P[i] that defines a respective scanline pixel [i] within an arbitrary scanline j, comprised of a red pixel R, a blue pixel B and a green pixel G.

SUM: characterizes the 'image content' or 'signal strength' of a respective scanline j, and is used to calculate Dmin, ascertain interframe gaps at frame edges, etc. The number of pixels in a scanline is dependent upon the parameters of the scanner and the film type specified. (As noted earlier, for the present description a nominal scanline contains 128 pixels.) SUM is denoted as:

$$\text{Sum [row]} = \sum_{\text{col}=1}^{\text{Scanline length}} \text{Neutral [row] [col]}$$

Thus, as shown in FIG. 5, for scanline j, the value SUM represents a the resultant neutral value obtained by summing the respective neutral values associated with each of the RGB triads P[i], P[i+1], ..., P[i+n] of which scanline j is comprised.

VARIATION: characterizes a change in signal strength for a respective scanline j and is employed in tuning oversized and undersized image frames to nominal image frame size. Undersized image frame regions are enlarged or 'grown' to nominal size by incrementally adding scanlines in the direction of which side of the image frame exhibits the larger variation. VARIATION is denoted as:

$$\text{Variation [row]} = \sum_{col=1}^{\text{Scanline length}} ABS(\text{Neutral[row][col]} - \text{Neutral[row][col} - 1])$$

Thus, as shown in FIG. 6, for scanline j, the value VARIATION represents the absolute value of the result of summing respective differences between RGB triads of adjacent scanlines, i.e. between P[i] of scanline j and P[i] of scanline j+1, through P[i+n] of scanline j and P[i+n] of scanline j+1.

PREVIOUS DELTA: characterizes a change in signal strength (SUM) between immediately adjacent (successive) scanlines j–1 and j. Thus as shown, in FIG. 7, PREVIOUS DELTA for scanline j is defined as:

PREVIOUS DELTA=SUM[j]–SUM[j–1].

Figure 8:
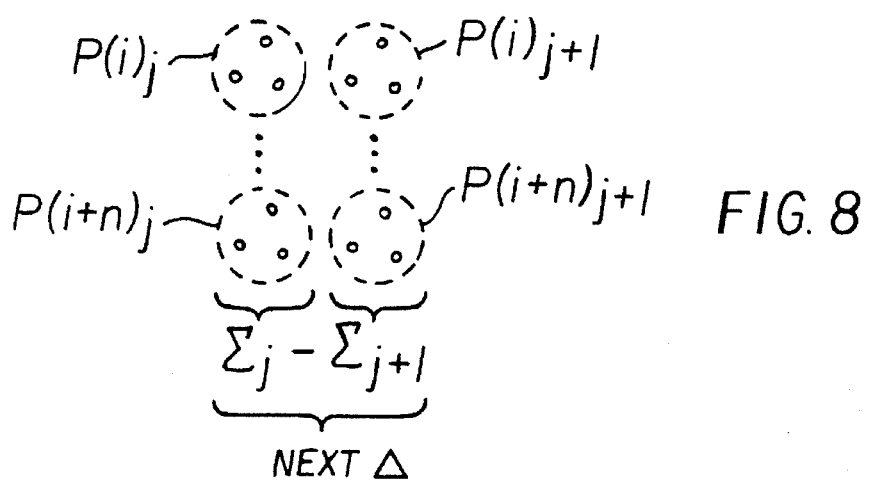
FIG. 8 diagrammatically illustrates the difference in sums for a NEXT DELTA for scanline j as NEXT DELTA=SUM[j+1]–SUM[j ]

NEXT DELTA: characterizes a change in signal strength (SUM) between immediately adjacent (successive) scanlines j and j+1. Thus as shown, in FIG. 8, NEXT DELTA for scanline j is defined as:

NEXT DELTA=SUM[j+1]–SUM[j].

Figure 9:
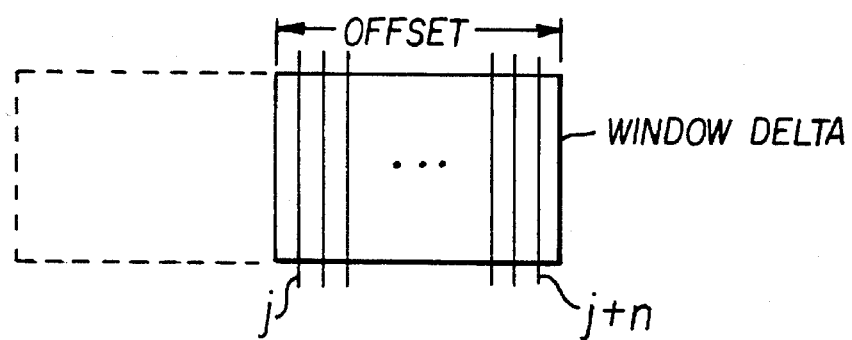
FIG. 9 diagrammatically illustrates WINDOW DELTA as a spatial differential between a given scanline j and another scanline j+k spatially displaced from the scanline j by the value of the window delta.

WINDOW DELTA: a measure to determine, in conjunction with a 'validity' threshold (defined below in the list of THRESHOLDS), whether a particular scanline j will be used in the calculation of adaptive thresholds. WINDOW DELTA is diagrammatically illustrated in FIG. 9 as a spatial differential between a given scanline j and another scanline j+k offset or spatially displaced from the scanline of interest by the value of the window delta. WINDOW DELTA is defined as:

$$\text{Window Delta [row]} = \sum_{\text{offset}=-\text{Range}}^{\text{Range}} ABS(\text{Next Delta[row + offset]})$$

THRESHOLDS

Thresholds are limits that aid in detecting and defining the properties of image frames within a given filmstrip data base. There are two classes of thresholds: adaptive and non-adaptive. Adaptive thresholds are dependent upon actual scanline data within the film scan order (the sequence of scanlines along the entirety of the image capture medium (e.g. along the length of a continuous film strip)), and thereby allow the frame detection mechanism to adjust itself to variations in characteristics of the exposed film (e.g. exposed frame size, gap density, etc.). Non-adaptive thresholds are thresholds that are independent of the scanline data, and have been empirically determined to not change the effectiveness of the frame detection mechanism.

VALIDITY THRESHOLD: A ('filtering') value which determines whether or not a particular scanline j will be permitted to participate in calculating those thresholds which are adaptive (designated below). This selective removal operation is carried out by adding or summing absolute values of the differences between adjacent scanlines within a window of scanlines centered on the scanline j under consideration and comparing the resultant sum against the validity threshold. Only if the sum is greater than the validity threshold will the scanline be used to establish adaptive thresholds. Namely, the validity threshold is employed to remove data where no significant information exists (such as film leader, unexposed or fogged areas of the film, for example), so as not distort the image frame histogram data.

Delta Threshold (Adaptive): A value where the lower x% (e.g. the 'x' default for negatives is 60%) of the previous-delta population occurs. Any scanline delta exceeding the delta threshold is a potential frame edge.

Dmin Threshold (Adaptive): A value where a prescribed percentage (e.g. the lower 6% (default)) of the scanline sum population occurs. Like the delta threshold, the Dmin threshold is also used in locating frame edges. Any scanline value lower than the Dmin threshold is considered unexposed.

Region-size Threshold: The minimum number of scanlines used to define a region and is a percentage of the value FrameWidth.

Signal Threshold (Adaptive): A value where a prescribed percentage (e.g. the lower 8% (default)) of the scanline sum population occurs. This threshold is used to determine if a particular scanline contains modulance. Any scanline above this threshold is considered to be exposed and part of a frame.

Gap (Min/Max) (Adaptive): Specifies the size of an interframe gap and is derived after all of the most obvious frames in the film order have been identified.

FrameWidth (Min/Max) (Adaptive): Specifies the frame-size range of the film order and is derived after all of the most obvious frames in the film order have been identified.

ITERATIVE IMAGE FRAME SEARCH PROCESS

AS described briefly above, the frame detection mechanism in accordance with the present invention involves an iterative search process through the digitized image database resulting from the scanning of the continuous image captured medium (film strip), beginning with a phase I search for 'well formed' frames, namely regions of the film strip that possess prescribed image content and frame boundary parameters, which permits such regions to be readily identified with a desired 'nominally whole image frame'. (As noted earlier, for purposes of providing a non-limitative example, a 'nominally whole' image frame is an image frame having a spatial resolution of 192 lines by 128 pixels per line.)

SYSTEM INITIALIZATION

Prior to initiating the search process, scanned data processing parameters are initialized in accordance with the preliminary processing flow diagrammatically illustrated in the flow chart diagram of FIG. 10. More particularly, at Step 101 of FIG. 10, any database scanline data that has resulted from operating the scanner prior to or subsequent to the presence of the image capture medium (film strip 10) within the film gate, is deleted from memory, so that the input to the frame detection mechanism of the present invention will contain only the contents of the film strip 10. Data from any other source (e.g. free space or non-film background is inherently erroneous and would otherwise skew valid data). Consequently, unless the scanline data is that associated with a scanline of the film strip, it is preliminarily excised from the database.

Following step 101, statistical predictor arrays associated with the predictors set forth above are allocated in memory. If the film strip is positive film, the data must be inverted. For this purpose, if the answer to positive film query step 103 is YES, the data is inverted in step 105, and the process proceeds to step 107, where the set of predictors is generated. If the film is negative (the answer to query step 103 is NO), the process proceeds to directly to step 107, to generate the set of predictors.

In step 111, memory is allocated for the delta arrays and respective next and previous delta predictors are generated. In step 113, any uninitialized system configuration settings are set with default values and any scanlines which are not to be included as part of the analyzed database are identified. To further reduce computational intensity, a histogram for each predictor set is generated in step 115. Finally, in step 117, each of the adaptive thresholds is determined in accordance with the system configuration and the predictor set histograms.

PHASE I (SEARCH FOR WELL FORMED FRAME)

A first category of well formed frame is one having the highest degree of certainty to be a complete image frame. Such a 'best' or 'optimum' well formed frame is diagrammatically illustrated in FIG. 11 as a 'level 1' frame, which consists of the spatial film data sequence: trailing edge 41 (of a previous image frame 40*i*−1), a first interframe gap 42, a leading edge 43 (of the well formed frame of interest 40*i*), frame image (modulance) data 44, a trailing edge 45 (of the well formed frame of interest 40*i*), a second interframe gap 46, and a leading edge 47 (of the next frame 40*i*+1).

A second category of well formed frames, which is 'less than best', or 'level 2', type of well formed frame includes those frames that substantially correspond to a 'level 1' or optimum well formed frame (FIG. 11), but lack either an initial trailing edge preceding the image frame of interest, or a final leading edge that follows the image frame of interest. A first alternative version of a 'level 2' well formed frame is diagrammatically illustrated in FIG. 12 as comprising the same spatial film data sequence as shown in FIG. 11, but lacking the leading edge 47 of the next frame 40*i*+1. A second alternative 'level 2' type of well formed frame is diagrammatically illustrated in FIG. 13, as comprising the same spatial film data sequence as shown in FIG. 11, but lacking the trailing edge 41 of previous image frame 40*i*−1.

Finally, a third ('level 3') category of well formed frame is diagrammatically illustrated in FIG. 14 as comprising the spatial film data sequence consisting of a first gap 42, a leading edge 43 (of the well formed frame of interest 40*i*), frame image data 44, a trailing edge 45 (of the well formed frame of interest 40*i*), and an interframe gap 46.

During the phase I search for a well formed frame, in addition to requiring that each of the three level types of well formed frames, described above, have at least a first gap, a leading edge, frame image data, a trailing edge and a second gap, the relative spacings between each successive attribute must conform with prescribed standards (associated with given film types), as will be described. During phase I, the iterative search process begins at level 1 and proceeds through level 3.

The flow process for a level 1 search for a well formed frame is diagrammatically illustrated in FIG. 15, beginning with step 201, which sets the starting point for a search for a well formed frame to the first scanline of the useable digitized image database (i.e. the beginning of the film order).

LEVEL 1 SEARCH

AS described briefly above with reference to FIG. 11, a level 1 image frame is a well formed image frame having the highest degree of certainty to be a complete image frame, and consists of the spatial film data sequence: trailing edge 41 (of a previous image frame 40*i*−1), a first interframe gap 42, a leading edge 43 (of the well formed frame of interest 40*i*), frame image (modulance) data 44, a trailing edge 45 (of the well formed frame of interest 40*i*), a second interframe gap 46, and a leading edge 47 (of the next frame 40*i*+1).

At step 203, 'level 1' frame criteria, namely associated thresholds and frame and gap search windows are established for a 'level 1' search, in accordance with the preliminary parameters set previously. Once these parameters have been initialized, the level 1 search sequence attempts to locate a trailing edge 41. For this purpose, as shown at step 205, for each respective scanline j within the frame search window, its next delta predictor is compared with the delta threshold and the scanline sum is compared with the Dmin threshold. If its associated next delta predictor exceeds the delta threshold and its associated next scanline sum is less than the Dmin threshold, then it is inferred that a trailing edge 41 has been located.

Once a trailing edge 41 has been found, the level 1 search begins to search for a leading edge 43 within a prescribed interframe 'gap' search window. For this purpose, as shown at step 207, for each respective scanline j within the interframe gap search window, its previous delta predictor is compared with the delta threshold and the its current scanline sum is compared with the Dmin threshold. If, within the gap search window, its associated previous delta predictor exceeds the delta threshold and its associated current scanline sum is less than the Dmin threshold, then it is inferred that a leading edge 43 has been located.

Having found a leading edge in step 207, then, in step 209, all of the scanline sum predictors between the trailing edge 41 and the leading edge 43 are compared with the Dmin threshold in order to determine whether an interframe gap exists between the two edges. Namely, if, within the gap window, each sum predictor is less than the Dmin threshold, then it is inferred that each sum predictor is at gap density (occurs in an interframe gap 42).

The next step is to locate another trailing edge 45 of the current frame. Again, as shown at step 211, for each respective scanline j within the search window, its next delta predictor is compared with the delta threshold and the scanline sum is compared with the Dmin threshold. If its associated next delta predictor exceeds the delta threshold and its associated next scanline sum is less than the Dmin threshold, then it is inferred that another trailing edge 45 has been located within the search window.

Once a second trailing edge 45 has been found, the level 1 search begins to search for another leading edge 47 within the prescribed gap search window. Again, as shown at step 213, for each respective scanline j within the gap search window, its previous delta predictor is compared with the delta threshold and the its current scanline sum is compared with the Dmin threshold. If its associated previous delta predictor exceeds the delta threshold and its associated current scanline sum is less than the Dmin threshold, then it is inferred that a new leading edge 47 has been located.

Finally, once a second leading edge 47 has been found, then, in step 215, all of the scanline sum predictors between the second trailing edge 45 and the second leading edge 47 are compared with the Dmin threshold in order to determine whether an interframe gap 46 exists between these two edges. As in the case of interframe gap 42, if, within the gap window, each sum predictor is less than the Dmin threshold, then it is inferred that each sum predictor is at gap density (occurs in an interframe gap 46). Once this second interframe gap is found, a well formed frame is declared in step 217.

AS described above, the Phase I search for a well formed frame is an iterative search process from level 1 through level 3, with the Phase I search not iterating from one level to the next until it has exhausted the entire film order at the current level of search.

LEVEL 2 SEARCH

The flow process for a level 2 search for a well formed frame is diagrammatically illustrated in FIG. 16, beginning with step 301, which sets 'level 2' frame criteria, namely associated thresholds and a search window are established for a 'level 2' search, in accordance with the preliminary parameters set previously. Again, as shown in FIG. 12, a level 2 image frame includes those frames that substantially correspond to a 'level 1' frame, but lack either an initial trailing edge preceding the image frame of interest, or a final leading edge that follows the image frame of interest. A level 2 search looks for each of the alternative versions shown in FIGS. 12 and 13.

For the first alternative of FIG. 12, after initially establishing search windows in step 301, the level 2 search sequence attempts to locate a trailing edge 41 of a (previous) frame. Again, as in the level 1 search and as shown at step 303, for each respective scanline j within the search window, its next delta predictor is compared with the delta threshold and the scanline sum is compared with the Dmin threshold. If its associated next delta predictor exceeds the delta threshold and its associated next scanline sum is less than the Dmin threshold, then it is inferred that an initial trailing edge 41 has been located.

Once this first trailing edge 41 has been found, the level 2 search begins to search for a leading edge 43 within a prescribed interframe gap 42 search window. As shown at step 305, for each respective scanline j within the gap search window, its previous delta predictor is compared with the delta threshold and the its current scanline sum is compared with the Dmin threshold. If its associated previous delta predictor exceeds the delta threshold and its associated current scanline sum is less than the Dmin threshold, then it is inferred that a leading edge 43 has been located.

Having found a leading edge in step 305, then, in step 307, all of the scanline sum predictors between the trailing edge 41 and the leading edge 43 are compared with the Dmin threshold in order to determine whether an interframe gap exists between the two edges. Namely, if, within the gap window, each sum predictor is less than the Dmin threshold, then it is inferred that each sum predictor is at gap density (occurs in an interframe gap 42).

The next step is to locate another trailing edge 45 of the current frame. As shown at step 309, for each respective scanline j within the search window, its next delta predictor is compared with the delta threshold and the scanline sum is compared with the Dmin threshold. If its associated next delta predictor exceeds the delta threshold and its associated next scanline sum is less than the Dmin threshold, then it is inferred that another trailing edge 45 has been located within the search window. Once a second trailing edge 45 has been found, a (level 2) well formed frame is declared in step 311.

If the search for the first alternative level 2 frame of FIG. 12 fails to initially locate a trailing edge, then the level 2 search attempts to locate a leading edge 43 of a second alternative 'level 2' type of well formed frame, diagrammatically illustrated in FIG. 13. As in the level 1 search and as shown at step 321, the level 2 search for a leading edge 43 involves, for each respective scanline j within the interframe gap search window, comparing its previous delta predictor with the delta threshold and the its current scanline sum is compared with the Dmin threshold. If its associated previous delta predictor exceeds the delta threshold and its associated current scanline sum is less than the Dmin threshold, then it is inferred that a leading edge 43 has been located.

Having found a leading edge in step 321, then, in step 323, all of the scanline sum predictors prior to the leading edge are compared with the Dmin threshold in order to determine whether an interframe gap exists immediately prior to the leading edge. Namely, if, within the gap window, each sum predictor is less than the Dmin threshold, then it is inferred that each sum predictor is at gap density (occurs in an interframe gap 42).

The next step 325 is to locate a trailing edge 45 of the current frame. For each respective scanline j within the search window, its next delta predictor is compared with the delta threshold and the its scanline sum is compared with the Dmin threshold. If its associated next delta predictor exceeds the delta threshold and its associated next scanline sum is less than the Dmin threshold, then it is inferred that another trailing edge 45 has been located within the search window. Once a trailing edge 45 has been found, the level 2 search looks for another leading edge, as in the level 1 search.

Once trailing edge 45 has been found, the level 2 search begins to search for another leading edge 47 within the prescribed interframe gap search window. As shown at step 327, for each respective scanline j within the interframe gap search window, its previous delta predictor is compared with the delta threshold and the its current scanline sum is compared with the Dmin threshold. If its associated previous delta predictor exceeds the delta threshold and its associated current scanline sum is less than the Dmin threshold, then it is inferred that a new leading edge 47 has been located.

Finally, once leading edge 47 has been found, then, in step 331, all of the scanline sum predictors between the second trailing edge 45 and the second leading edge 47 are compared with the Dmin threshold in order to determine whether an interframe gap 46 exists between these two edges. If, within the interframe gap window, each sum predictor is less than the Dmin threshold, then it is inferred that each sum predictor is at gap density (occurs in an interframe gap 46). Once this interframe gap is found, a well formed frame is declared in step 333.

LEVEL 3 SEARCH

The flow process for a level 3 search for a well formed frame is diagrammatically illustrated in FIG. 17, beginning with step 401, which sets 'level 3' frame criteria, namely associated thresholds and a search window are established for a 'level 3' search, in accordance with the preliminary parameters set previously. As shown in FIG. 14, a level 3 image frame includes those frames that consist of a first interframe gap 42, a leading edge 43 (of the well formed frame of interest 40i), frame image data 44, a trailing edge 45 (of the well formed frame of interest 40i), and a second gap 46.

After initially establishing search windows in step 401, the level 3 search sequence attempts to locate a leading edge 43. As shown at step 403, for each respective scanline j within the search window, its previous delta predictor is compared with the delta threshold and the its current scanline sum is compared with the Dmin threshold. If its associated previous delta predictor exceeds the delta threshold and its associated current scanline sum is less than the Dmin threshold, then it is inferred that a leading edge 43 has been located.

Having found a leading edge in step 403, then an attempt is made to locate a trailing edge 45 of the current frame. For this purpose, as shown at step 405, within a 'frame' search window, for each respective scanline j within the search window, its next delta predictor is compared with the delta threshold and the next scanline sum is compared with the Dmin threshold. If its associated next delta predictor exceeds the delta threshold and its associated next scanline sum is less than the Dmin threshold, then it is inferred that a trailing edge 45 has been located within the search window. Once a trailing edge 45 has been found, a (level 3) well formed frame is declared in step 407.

'CHOP FRAMES' ROUTINE

In accordance with the present invention, in the course of a search for a well formed image frame, whenever a well formed image frame (associated with that particular level of search) is found, it is inferred that the located well formed frame is preceded or succeeded by one or more additional valid image frames, in order that the locations of such additional valid frames may be expeditiously determined without employing the relatively rigorous search for well formed frames in these portions of the film order.

For this purpose, once a well formed frame has been located, a less stringent set of criteria is employed in a 'chop frames' routine, which is operative to identify additional valid or nominally whole image frames within the film strip data base. This less stringent criteria looks to determine whether, relative to an identified well formed frame, there are any succeeding or preceding frames that contain at least one edge, as will be described below with reference to FIG. 18. Whenever such additional valid frames are located, their locations are precisely located via database pointers, so that such frames may be removed or 'chopped' out of the scanline database and not considered during further steps of the iterative search process, to be described.

The image data processing operator employed by the chop frames routine requires that at least one edge of a frame be detected in order to continue finding frames without resorting to finding another well formed frame. The other edge of the frame may itself be detectable or must be considered to have a value corresponding to Dmin. (As noted earlier each frame edge (leading or trailing) has its value based upon Dmin.) For an ideal frame of a given nominal frame size, the leading edge of a frame is the first scanline of the frame containing signal encountered in the order in which successive images are examined, and must be preceded by a scanline associated an interframe gap (unexposed, Dmin). Conversely, the trailing edge of an ideal nominal frame is the last scanline of the frame containing signal encountered in the order in which successive images are examined, and must be succeeded by a scanline associated an interframe gap (unexposed, Dmin). Since, however, actual frames vary in size and, moreover, image frames output by the frameline detection process are prespecified to be slightly smaller than the frame size of a scanned image, in order to optimize the signal content of each image, image frame edges actually encompass several scanlines, rather than a single scanline.

The chop frames routine begins chopping frames in a 'forward' direction, i.e. frames that spatially succeed the well formed frame of interest, until it can no longer chop valid frames. It then returns to the starting point of the well formed frame of interest and chops frames that precede the well formed frame of interest, i.e. in a backward direction. It should be noted that in the chop frames routine to be described the leading and trailing edges occur in the direction of carrying out the process. Thus, for preceding frames in the backwards chop direction the leading edge and the trailing edges are reverse to those in the forward direction through succeeding frames.

Referring now to FIG. 18, the first step 501 of the chop frame routine inquires whether, within a prescribed number of scanlines following a well formed image frame, a leading edge is encountered. Again, delta predictor/threshold and Dmin comparisons described above in connection with the search for a well formed frame are employed. If the answer to the leading edge detection inquiry step 501 is YES, then, in step 503 the chop routine sets a search window relative to the detected leading edge and searches for a trailing edge. Namely, in step 503, the chop routine inquires whether a trailing edge occurs within a prescribed number of range of scanlines spaced apart from the leading edge. If the answer to step 503 is YES, then in step 505 a valid frame is declared and the chop frames routine proceeds to look for the next valid frame, using the same edge detection criteria.

If the result of step 503 is NO, indicating that no trailing edge has been detected within the trailing edge window, the process proceeds to step 507, which inquires whether the trailing edge window exhibits Dmin-like properties. If the answer to step 507 is YES, then a valid frame is declared in step 509. If the answer to step 503 is NO, indicating the no trailing edge was detected, and step 507 is NO, indicating that the region within the trailing edge window is not at the density level (Dmin) of an interframe gap, then the region is declared as being ambiguous in step 511.

If the answer to the leading edge detection inquiry 501 is NO, then the process proceeds to step 521, which inquires whether the leading edge window exhibits Dmin-like properties. If the answer to step 521 is YES, then it is inferred that the image frame of interest is sufficiently underexposed on the leading edge side of the image frame to be associated with an interframe gap (Dmin). The routine then proceeds to step 523 to look for a trailing edge within a prescribed number of scanlines, as described above. If a trailing edge is detected as occurring within the prescribed number of range of scanlines spaced apart from the assumed location of the leading edge, the answer to step 523 is YES, and a valid frame is declared in step 525, and the chop frames routine proceeds to look for the next valid frame, using the above described edge detection criteria. On the other hand if the answer to step 523 NO, indicating the no trailing edge was detected and that the region within the trailing edge window is not at the density level (Dmin) of an interframe gap, then the region is declared in step 527 as being ambiguous.

If the answer to the leading edge detection inquiry 501 is NO, and the leading edge window does not exhibit Dmin-like properties, (the answer to step 507 is NO), then step 529 declares the region as ambiguous, the chop frames routine is terminated, and the search for a well formed frame is resumed. Once the chop frame routine has been completed in the forward direction, it returns to the starting point of the well formed frame of interest and chops frames that precede the well formed frame of interest, i.e. in a backward direction.

When the valid frame chopping criteria are no longer satisfied, the process returns to looking for the next well formed frame for the search level of interest. Whenever a well formed frame is again found, the chop frames process is again initiated. In other words, the search for a well formed frame implies a follow-on chopping operation (to the extent possible). The search for well formed frames and the chopping of nominally valid frames continues until the entirety of the scanned film database has been processed in accordance with the phase I, search and chop procedure. At any instance during the phase I operation, where film image data represents a potential image frame, but one that does not satisfy phase I detection and extraction criteria, the film region of interest is labelled an 'ambiguous' image frame, and is subjected to further processing, to be described.

Once Phase I processing has been completed, the sizes of the frames identified thus far are employed to establish a standard frame size and maximum and minimum frame size and gap size limits to be used in Phase II and Phase III processing to be described. Namely, because the Phase I search looks for a number of spatial components of a frame, it is inferred that the parameters of frames detected in the Phase I search are typical of the sizes of all frames to be processed, and thereby can be used to establish valid limits on a less rigorous set of criteria through which those regions that have been labelled as 'ambiguous' according to phase I standards may be identified as nominally whole image frames during Phases II and III.

PHASE II (FITTED SEARCH)

After completing phase I processing, the methodology of the present invention proceeds to a phase II ('fitted image frame') procedure, which looks to see if any of the thus far 'ambiguous' labelled portions of the film strip has a spatial size that will allow a 'fitting' of an integral number of image frames, each of which has a size sufficient to accommodate an image frame region whose size is the average of that of a well formed frame detected in phase I, and which is bounded by a pair of interframe gaps whose dimensions are those of the interframe gaps of a well formed frame.

Figure 19:
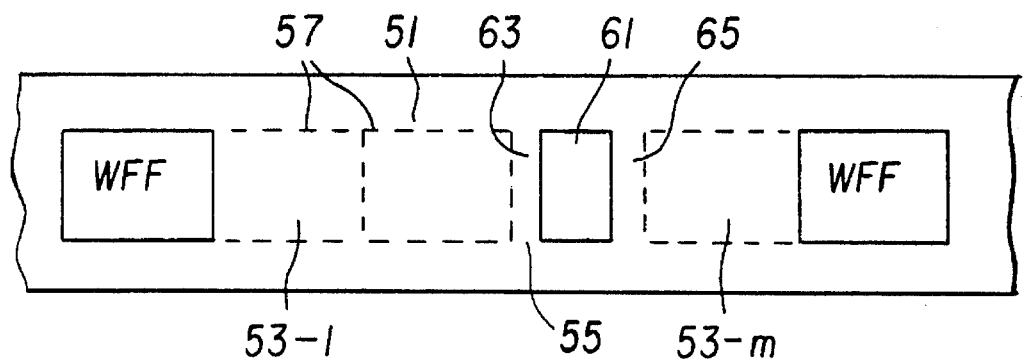
FIG. 19 diagrammatically illustrates the manner in which a film region that has been labelled as 'ambiguous' as a result of Phase I processing may accommodate an integral number of image frames.

Namely, as diagrammatically illustrated in FIG. 19, if the extent of a film region 51, that has been labelled as 'ambiguous', as a result of Phase I processing, is sufficient to accommodate an integral number of image frames 53-1 . . . 53-m, then the potential image frame area 51 is subdivided into a grid 55, respective cells 57 of which correspond to the size of a 'standard size' image frame sufficient to accommodate an interior image modulance portion 61 bounded by a pair of interframe gap regions 63 and 65 on opposite sides thereof. In order to be identified as a valid frame, at least one scan line of the interior portion 61 of a respective cell 57 must contain image modulation ('signal') of at least a prescribed threshold (to be described) and each of its associated interframe gap regions 63 and 65 must have a gap-like (Dmin) density characteristic. Each cell of a subdivided ambiguous film strip area that has satisfied these two requirements is labelled as a valid frame and its identification (in terms of database pointers) is added to the list of frames that identified as well formed frames and those chopped from the database during phase I processing. Any ambiguous portion of the film strip database that still remains after Phase II processing is next subjected to Phase III processing.

PHASE III (OVERSIZE, UNDERSIZE SORTING)

Upon completion of phase II processing, the frame detection mechanism of the present invention proceeds to a phase III (oversize, undersize sorting) procedure, which looks to see whether any of the still remaining 'ambiguous'-labelled portions of the film strip has a size sufficient to accommodate an image frame region and if the region contains modulance. If so, the region is classified according to its size and subjected to further processing based upon frame size classification.

Figure 20:
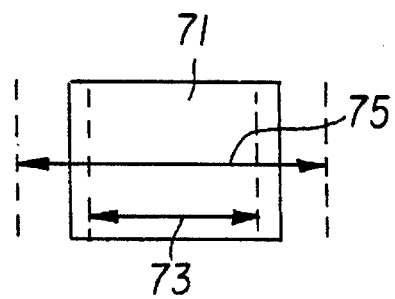
FIG. 20 diagrammatically illustrates a modulance-containing region being greater than or equal to a prescribed minimum frame size and less than or equal to a prescribed maximum frame size.

More specifically, as diagrammatically illustrated in FIG. 20, if the size of the modulance-containing region 71 is greater than or equal to a prescribed minimum frame size 73 and is less than or equal to a prescribed maximum frame size 75, then modulance containing region 71 is labelled as a nominally acceptable frame and chopped from the film strip database to be included on the valid frame list thus far assembled in phases I and II of the frame detection mechanism.

Figure 21:
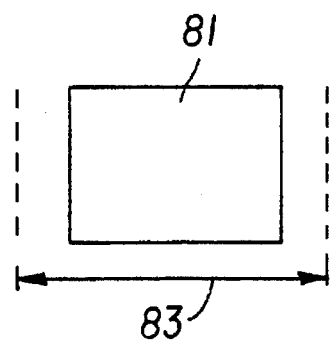
FIG. 21 shows a modulance-containing region being less than minimum frame size, as an 'undersized' frame to be subjected to undersize processing, so that it may be combined with another undersized frame.

On the other hand, as shown in FIG. 21, if the size of the modulance-containing region 81 is less than the minimum frame size 83 (the same size as 73 above), then the region is labelled as an 'undersized' frame and is subjected to undersize processing, so that, if possible, it may be combined with another undersized frame, as will be described.

Figures 22, 23, 24, 25:
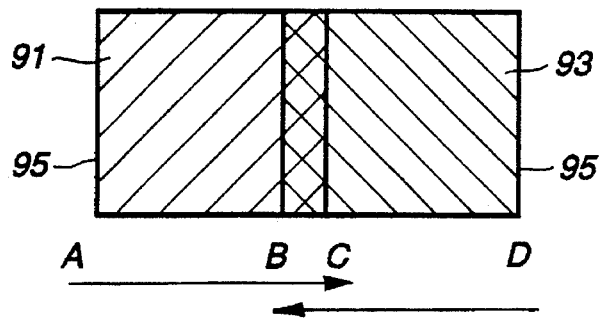
FIG. 22 diagrammatically illustrates a modulance-containing region overlapping another modulance-containing region.
FIG. 23 shows an "overlap 25" image frame.
FIG. 24 shows an "overlap 50" image frame.
FIG. 25 shows an "overlap 75" image frame.

If the size of the modulance-containing region is greater than maximum frame size, then the frame is 'oversized' and it is inferred than such an oversized frame is a combination of at least two frames, which needed to be partitioned or subdivided into respective 'stand-alone' image frames. For this purpose, a determination is made as to whether such an 'oversized' region is less than or equal to twice the maximum frame size. If the oversized region does not exceed twice the maximum frame, then it is inferred that the oversized region is a combination of only two images that overlap or abut one another, as diagrammatically illustrated in FIG. 22, which shows modulance-containing region 91 overlapping another modulance-containing region 93, the two regions 91, 93 being bounded by (Dmin) gaps 95. In this case, the dual region 91-93 is labelled as a 'simple' overlap image frame, which is subjected to further processing, to be described, in order to classify the degree or extent of overlap in preparation of further processing.

More particularly, the degree of overlap is defined as one of three categories: "overlap 25" shown in FIG. 23, where the region size is less than twice the maximum frame size but greater than or equal to 1.5 times maximum frame size (representative of a range of up to a 25% overlap of the two modulance containing image regions 91-93); "overlap 50" shown in FIG. 24, where the region size is less than 1.5 times the maximum frame size but greater than or equal to 1.25 times maximum frame size (representative of a range up to a 50% overlap of the two modulance containing image regions 91-93); and "overlap 75" shown in FIG. 25, where the region size is less than 1.25 times the maximum frame size, but greater than or equal to maximum frame size (representative of a range of up to a 75% overlap of the two modulance containing image regions 91-93).

Figure 26:
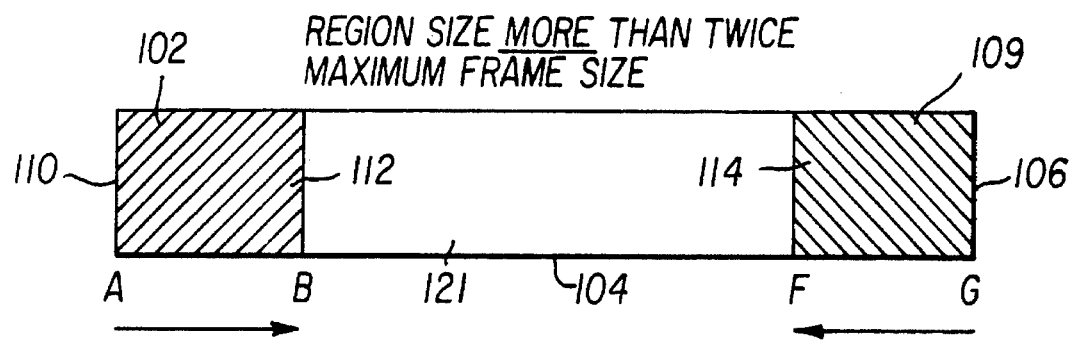
FIG. 26 diagrammatically illustrates the size of an oversized modulance-containing region being greater than twice the maximum frame size.
Figure 27:
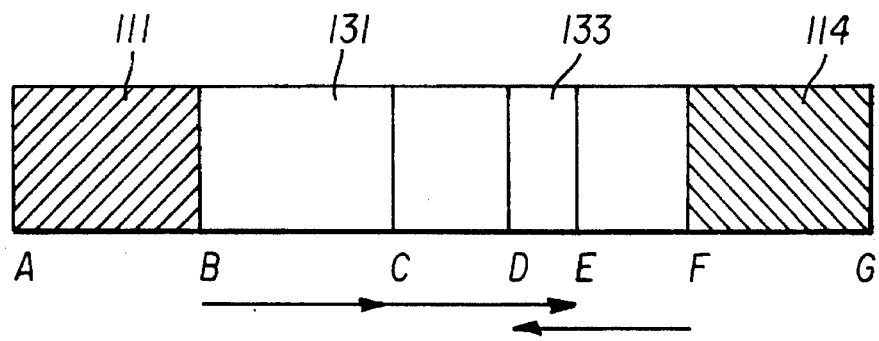
FIG. 27 shows a residual portion of an oversized image remaining after the excision of overlap regions further from its leading and trailing edges into further excised regions.

If the size of the oversized modulance-containing region is greater than twice the maximum frame size, then it is inferred that more than two images overlap one another, as diagrammatically illustrated in FIG. 26, wherein the oversized modulance-containing region 104 of interest overlaps two additional modulance-containing regions 102, 109. In this case the oversized region 104-102-109 is labelled as a 'multiple' overlap image frame, which is subjected to an edge-excision procedure that extracts a pair of images from each of the leading edge 110 and the trailing edge 106 of the oversized image region, denoted by regions 112 and 114 in FIG. 26. Each of the excised regions 112 and 114 is sized to fall within the overlap 25 category, described above. The residual portion 121 of the oversized image remaining after the excision of overlap 25 regions 112 and 114 is labelled as ambiguous and then further reduced, to the extent possible, from its leading and trailing edges into further excised regions 131, 133, as shown in FIG. 27. Namely, reduction of multiple oversized regions proceeds from the outside-in, from the leading and trailing edges, until the residual region is less than the maximum size of a nominal image frame. Such a residual image is denoted as ambiguous.

Figure 28:
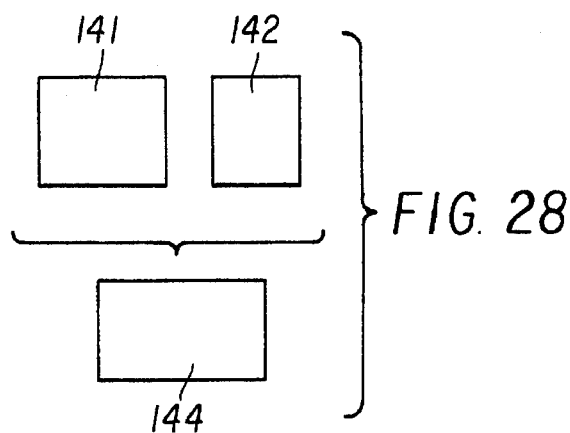
FIG. 28 shows a pair of undersized regions mutually adjacent to one another, each being dimensioned less than the frame width of a maximum image frame, to be combined into a single image frame.

If the size of the modulance-containing region 81 is less than the minimum frame size, as shown in FIG. 21, referenced above, then the region is labelled as an 'undersized' frame, and an attempt is made to combine the undersized region with another, adjacent undersized region. Specifically, the undersized region of interest is merged or combined with one or more successively adjacent undersized regions as long as the size of the resulting merged region is no greater than the maximum size of a nominal image frame. Thus, with reference to FIG. 28, a pair of undersized regions 141 and 142 are shown as being mutually adjacent to one another, each being dimensioned less than the frame width of a maximum image frame. As a consequence, these two modulance-containing frame regions are combined into a single image frame 144. If the size of the resultant frame is less than maximum frame size an attempt is made to combine resultant image frame 144 with a further adjacent undersized modulation-containing region within the ambiguous portion of the film strip database under consideration. This process continues until it is determined that the resultant image frame will exceed maximum frame size. In this event, no further combining of undersized image frames with the frame of interest is conducted. If what remains is a single or plural non-combinable undersized images, such regions are labelled as ambiguous regions.

Once all oversized frames have been reduced and labelled and all undersized frames have been combined and labelled, they are added to the list of valid image frames. All remaining regions within the film strip database are labelled as ambiguous frames and are excluded from the list of valid images frames.

TUNING IMAGE FRAME SIZE

With a valid image list completed, the size of each image on the list is adjusted, as necessary, to conform with the size of a nominal image frame, e.g. a 128 pixel×192 pixel image frame. This operation, hereinafter referred to as 'tuning' of the image frame, serves to equate the size of each image with a prescribed base image size employed by the digital image processing system, in particular by the scene balance mechanism for deriving control information to be used for optimizing the manner in which a subsequently scanned high resolution digitized image is to be mapped into memory. As pointed out above, the result of such analysis is used to calibrate the sensitivity parameters of the film scanner during the high resolution scan, so that the essential subject matter of the image which is necessary to reproduce a high quality image will fall within the linear portion of the response range of the scanner's imaging pixel array.

Tuning of a respective image frame involves analyzing the size of a respective image to determine whether it matches the (128×192) size of a nominal image frame. If so there is no change. If the image is oversized, the size of the image is reduced or 'shrunk' to nominal. If the image is undersized, the size of the image is increased or 'grown' to nominal.

Figure 29:
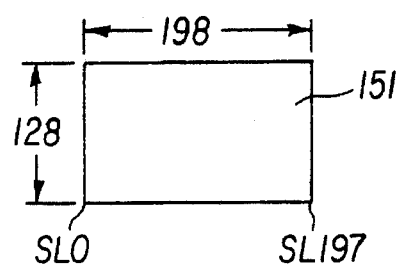
FIGS. 29, 30 and 31 diagrammatically illustrate the manner in which an oversized image is reduced by an iterative scanline removal sequence.
Figure 30:
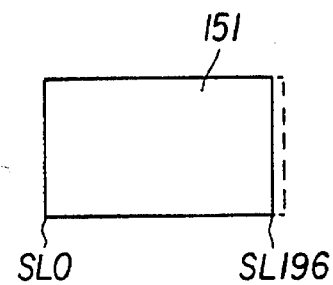
Figure 31:
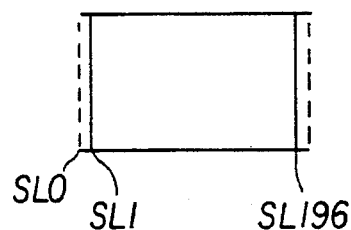

FIGS. 29 and 30 diagrammatically illustrate the manner in which an oversized image is reduced by an iterative scanline removal sequence. In particular, FIG. 29 illustrates an image 151 having an original size of 128 columns×198 scanlines of pixels. The respective scanlines are labelled columns SL0 . . . SL197, where scanline SL0 is associated with the leading or leftmost edge of the image, and scanline SL197 is associated with the trailing or rightmost edge of the image. Pursuant to the present invention, the variation between the contents of the leading edge scanline SL0 and its adjacent image scanline SL1 is compared with the variation between the contents of the trailing edge scanline SL197 and its adjacent image scanline SL196. For that pair of scanlines whose variation is smallest, the outermost or 'edge' scanline is excised from the image frame, so as to reduce the size of the image frame by one scanline. In the present example, assuming that the variation between the contents of the leading edge-scanline SL0 and its adjacent image scanline SL1 is larger than the variation between the contents of the trailing edge scanline SL197 and its adjacent image scanline SL196, then scanline SL197 is discarded from the image frame and scanline SC196 becomes the new trailing edge of the image frame, as shown in FIG. 30. Let it next be assumed that, after discarding original trailing edge scanline 197, the variation between the contents of the leading edge scanline SL0 and its adjacent image scanline SL1 is now smaller than the variation between the contents of the new trailing edge scanline SL196 and its adjacent image scanline SL195. In this case, leading edge scanline SL0 is discarded from the image frame and scanline SL1 becomes the new leading edge of the image frame, as shown in FIG. 31. This process is repeated, as necessary, until the total number of scanlines corresponds to that of a nominal image (e.g. 192 scanlines). Once the total number of scanlines matches that (e.g. 192 scanlines) of a nominal image frame, no further adjustment in image frame size is performed and the image frame is considered to be tuned.

Figure 32:
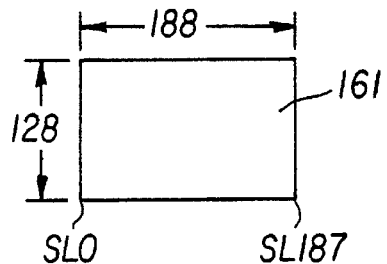
FIGS. 32 and 33 diagrammatically illustrate the manner in which an undersized image is 'grown' by an iterative scanline addition sequence.
Figure 33:
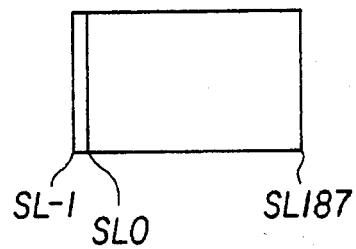

FIGS. 32 and 33 diagrammatically illustrate the manner in which an undersized image is 'grown' by an iterative scanline addition sequence. In particular, FIG. 32 illustrates an undersized image 161 having an original size of 128 columns×188 scanlines of pixels. The respective scanlines are labelled columns SL0 . . . SL187, where scanline SL0 is associated with the leading or leftmost edge of the image, and scanline SL187 is associated with the trailing or rightmost edge of the image frame. To grow an image frame, the variation between the contents of the leading edge scanline SL0 and its adjacent image scanline SL-1 outside of the undersized image frame is compared with the variation between the contents of the trailing edge scanline SL187 and its adjacent image scanline SL198 outside of the image frame. For that pair of scanlines whose variation is largest, the adjacent scanline outside of the image frame is added to the image frame, so as to increase the size of the image frame by one scanline. A caveat to this process is the requirement that the adjacent scanline to be added to the image frame cannot be part of an adjacent image frame. If one side of an under-sized frame has been expanded to the limit of its field of expansion (the scanline next to an adjacent frame), then the remaining expansion will occur on the opposite side of the frame. If this encroaches on an adjacent side, then the undersized image frame region is considered to be ambiguous and is labelled as such. In the present example, assuming that the variation between the contents of the leading edge scanline SL0 and its adjacent outside scanline SL-1 is larger than the variation between the contents of the trailing edge scanline SL187 and its adjacent image scanline SL198, then scanline SL-1 is added to the image frame and scanline SC-1 becomes the new leading edge of the image frame, as shown in FIG. 33. As in the case of iteratively reducing the size of an oversized image, this process is repeated, as necessary, until the total number of scanlines corresponds to that of a nominal image frame (e.g. 192 scanlines). Once the total number of scanlines matches that (e.g. 192 scanlines) of a nominal image frame, no further adjustment in image frame size is performed and the image frame is considered to be tuned.

As will be appreciated from the foregoing description of the frame detection mechanism of the present invention, rather than initially assume that all images are well defined and periodically separated from one another by equally sized interframe gaps, no a priori assumption as to where images are located or how many images may be contained on the film strip is made. Instead, the invention examines the entirety of the contents of the film strip to accurately identify the location of every 'nominally whole' image frame that is capable of being successfully processed into an output digital image, in accordance with set of image frame identification operators, which iteratively identify locations of nominally valid frames, beginning with the identification of all well formed frames. Each well formed frame has prescribed image frame attributes including at least a spatial region of image modulance bounded by leading and trailing edges adjacent to Dmin interframe gaps. The iterative identification procedure includes 'chopping' less than well formed frames, sorting frame regions based upon geometry considerations and identifying and adjusting the size of oversized and undersize frames. To reduce computational complexity a set of image frame-based 'predictors' and an associated set of thresholds are used in the iterative search and sort process.

From the identification process, a list of address space pointers is produced, the address pointers pointing to where, within the digitized film strip database, all of the image frames, that are contained on said film strip and have been determined to be capable of producing acceptable images for processing by the digital image processing system into acceptable nominal output images for storage on a Photo CD, are located. Since the respective scanlines produced by the film scanner are associated with physical locations on the film, the scan controller uses the pointers produced by the frame detection mechanism to control the operation of the film scanner during the high spatial resolution rescan, so as to precisely align the operation of the film gate with successive image frame-containing locations on the film.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

Parts List

10 Film strip
11 Photographic images
12 Film scanner
13 Imaging optics
14 Workstation/processor
16 Display
17 Film advance unit
18 Digital to analog converter
19 Innerframe gap
21 Supply reel
23 Take-up reel
25 Scanline
31 Frame leading edge
33 Frame trailing edge
35 Image frame overlap
37 Frame with no discernible edge
40$i$ Well formed frame of interest
40$i$-1 Previous image frame
40$i$+1 Next image frame
41 Trailing edge
42 Interframe gap
43 Leading edge
44 Frame image data
45 Trailing edge
46 Interframe gap
47 Leading edge Parts List Cont'd 51 Film region/image frame area
53-1 Image frames
53-m Image frames
55 Grid
57 Respective cell
61 Interior image modulance portion
63 Interframe gap region
65 Interframe gap region
71 Modulance containing region
73 Prescribed minimum frame size
75 Prescribed maximum frame size
81 Modulance-containing region
83 Minimum frame size
91 Modulance-containing region
93 Modulance-containing region
95 Gap
101 Eliminating step
102 Modulance-containing region
103 Creating predictor arrays
104 Oversized modulance-containing region
105 Normalizing stat predictor
106 Trailing edge
107 Generating stat predictor
109 Modulance-containing region
110 Leading edge Parts List Cont'd 111 Memory allocation and generating step
112 Region 113 Installing the defaults for uninitialized configuration settings
114 Region
115 Generating a histogram
117 Determining adaptive thresholds
121 Residual portion
131 Regions
133 Regions
141 Undersized regions
142 Undersized regions
144 Image frame
151 Image
161 Undersized image Parts List Cont'd 201 Initializing the starting point
203 Establishing search windows
205 Finding next trailing edge
207 Procedure if trailing edge is found
209 Procedure if leading edge is found
211 Finding next trailing edge
213 Procedure if trailing edge is found
215 Procedure if leading edge is found
217 Well formed frame was found
301 Establishing search windows
303 Finding next trailing edge
305 Finding next leading edge
307 Scanline sum predictors step
309 Finding next trailing edge step
311 Well formed frame was found
321 Procedure if leading edge is found
323 If scanline sum predictor prior to the leading edge was at gap density
325 Scanline sum predictors step
327 Finding next trailing edge step
331 Procedure if trailing edge is found
333 Well formed frame was found
401 Establishing step
403 Finding the next leading edge
405 Finding the next trailing edge
407 Well formed frame was found Parts List Cont'd 501 Procedure if lead edge is detected
503 Searching window of scanlines for trailing edge
505 Procedure if trailing edge is detected
507 Procedure if trailing edge is not detected
509 Allowing stage
511 Procedure if neither trailing nor Dmin is detected
521 Procedure if lead edge not detected
523 Procedure if trailing edge is detected
525 Allowing region to be denoted as a frame and test next region
527 Procedure if trailing edge not detected
529 Procedure if lead edge not detected

What is claimed:

1. A method of processing an image recording medium that contains a plurality of image frames, each of said image frames having respective location on said image recording medium, comprising the steps of:

(a) scanning said image recording medium so as to produce data representative of contents of successive scan lines of said image recording medium;

(b) processing data produced in step (a) in accordance with a first image frame identification operator for locating a well formed image frame, said first image frame identification operator, in response to identifying a location of a well formed image frame on said image recording medium, generating a first output representative of a first portion of said image recording medium containing said location of a well formed image frame, wherein a well formed image frame is defined as having prescribed image frame attributes including a first spatial region of image modulance that is bounded by leading and trailing edges, said leading and trailing edges of said well formed image frame demarcating respective leading and trailing image frame boundaries between said first spatial region of image modulance and respective second and third regions adjacent to said first spatial region of image modulance, said second and third regions being associated with an image level that is less than a prescribed threshold representative of an absence of image information;

and wherein said first image frame identification operator is operative to locate a well formed image frame, and to generate said first output associated therewith, irrespective of whether or not either a leading or a trailing image frame boundary of another image frame is adjacent to said location of a well formed image frame; and (c) in response to step (b) locating a well formed image frame, processing data produced in step (a) associated with second portions of said image recording medium other than said first portion containing the location of the well formed image frame located in step (b), in accordance with a second image frame identification operator, said second image frame identification operator locating additional image frames on said image recording medium in accordance with at least one, but less than all, of said prescribed image frame attributes of a well formed image frame, and generating second outputs representative of locations of said additional image frames.

2. A method according to claim 1, wherein said second image frame identification operator produces a third output representative of third portions of said image recording medium for which said second image frame identification operator has not located said additional image frames in step (c).

3. A method according to claim 2, further comprising the step of:

(d) processing data produced in step (a), associated with said third portions of said image recording medium for which said second image frame identification operator has not located said additional image frames in step (c), in accordance with a third image frame identification operator, which produces a fourth output representative of whether said third portions of said image recording medium have a capability of spatially accommodating an integral number of image frames having a size of said well formed frame.

4. A method according to claim 3, wherein step (d) further comprises spatially subdividing a respective one of said third portions of said image recording medium, for which said third image frame identification operator has produced said fourth output, into an integral number of tentative image frame regions and processing each tentative image frame region in accordance with a fourth image frame identification operator which produces a fifth output in response to said each respective tentative image frame region having attributes associated with a well formed image frame.

5. A method according to claim 4, wherein said fourth image frame identification operator produces said fifth output in response to said each respective tentative image frame region having a first spatial area containing at least one scan line of image modulance, second and third spatial areas bounding said first spatial area, and being associated with said image level less than said prescribed threshold.

6. A method according to claim 5, further comprising the step of:
(e) processing data produced in step (a), associated with fourth portions of said image recording medium for which said fifth output was not produced in step (d), in accordance with a fifth image frame identification operator which produces a sixth output associated with a further tentative image frame region that contains image modulance, but for which said fifth output was not produced in step (d).

7. A method according to claim 6, further comprising the step of:
(f) adjusting a size of said further tentative image frame region to a size of said well formed image frame.

8. A method according to claim 7, wherein step (f) further comprises, in response to the size of said further tentative image frame region being oversized so as to exceed a predetermined image frame size, partitioning said further tentative image frame region into a plurality of partitioned image frames each of an image frame size of a well formed frame.

9. A method according to claim 7, wherein step (f) further comprises, in response to the size of said further tentative image frame region being undersized, less than a preselected frame size, combining said further tentative image frame region with another further tentative image frame region that is undersized to form a combined image frame.

10. A method according to claim 1, wherein step (a) comprises translating said image recording medium with respect to an opto-electronic scanning device so as to effect a sequential scanning of said image recording medium at a prescribed scanning resolution and thereby producing digital data respectively representative of the contents of successive scan lines of said image recording medium.

11. A method according to claim 1, wherein said image recording medium comprises a photographic film strip.

12. A method according to claim 1, wherein step (b) comprises transforming data produced in step (a) into a set of predictors associated with image frame parameters that more directly represent attributes of an image frame necessary to identify where, on said image recording medium, image frames are located.

13. A method according to claim 12, wherein step (b) comprises processing said set of predictors in accordance with an associated set of adaptive thresholds, which are dependent upon actual scanline data within a film scan order of said image recording medium, so as to allow said first and second image frame identification operators to adjust to variations in characteristics of the image recording medium.

14. A method according to claim 13, wherein step (b) further comprises processing said set of predictors in accordance with a set of non-adaptive thresholds which are independent of scanline data.

15. A method according to claim 12, wherein said predictors include a neutral predictor representative of density of a respective scanline pixel i denoted as a summation of red, green and blue pixel densities.

16. A method according to claim 15, wherein said predictors include a sum predictor representative of signal strength of a respective scanline j, as a resultant neutral value, obtained by summing respective neutral values associated with each of RGB triads Pi, Pi+1, ..., Pi+n of which said scanline j is comprised.

17. A method according to claim 15, wherein said predictors include a variation predictor associated with a change in signal strength for a respective scanline j, represented as absolute value of a result of summing respective differences between RGB triads of adjacent scanlines, between Pi of scanline j and Pi of scanline j+1, through Pi+n of scanline j and Pi+n of scanline j+1.

18. A method according to claim 16, wherein said predictors include a predictor previous delta associated with a change in signal strength SUM between immediately adjacent scanlines j−1 and j.

19. A method according to claim 16, wherein said predictors include a predictor next delta associated with a change in signal strength SUM between immediately adjacent scanlines j and j+1.

20. A method according to claim 12, wherein step (b) comprises processing said set of predictors in accordance with a set of thresholds.

21. A method according to claim 20, wherein said thresholds include adaptive thresholds which are dependent upon actual scanline data within a film scan order of said image recording medium, so as to allow said first and second image frame identification operators to adjust to variations in characteristics of said image recording medium, and wherein said predictors include a predictor window delta associated with whether a particular scanline j is to be used in calculating adaptive thresholds, said window delta being a spatial differential between a given scanline j and another scanline j+k spatially displaced from a scanline of interest.

22. A method according to claim 21, wherein said thresholds include a validity threshold value which determines whether or not a particular scanline j will be permitted to participate in calculating thresholds which are adaptive.

23. A method according to claim 22, wherein step (b) further comprises summing absolute values of differences between adjacent scanlines within a window of scanlines centered on a scanline j under consideration, comparing a resultant sum against said validity threshold, and allowing said scanline j to be used to establish an adaptive threshold in response to an absolute value sum being greater than said validity threshold.

24. A method according to claim 20, wherein said thresholds include a delta threshold and wherein any scanline delta exceeding said delta threshold is considered to be a potential frame edge.

25. A method according to claim 20, wherein said thresholds include a Dmin threshold and wherein any scanline value lower than said Dmin threshold is considered to be unexposed.

26. A method according to claim 20, wherein said thresholds include a region-size threshold representative of a minimum number of scanlines used to define an image frame region.

27. A method according to claim 20, wherein said thresholds include a signal threshold used to determine if a particular scanline contains image modulance and above which a respective scanline is considered to be exposed and part of an image frame.

28. A method according to claim 20, wherein said thresholds include a gap threshold representative of a size of an interframe gap derived in accordance with all identified well formed frames.

29. A method according to claim 20, wherein said thresholds include a framewidth threshold representative of a frame-size range of a film order derived in accordance all identified well formed frames.

30. A method of processing an image recording medium that contains a plurality of image frames, each of said image frames having a respective location on said image recording medium, comprising the steps of:

(a) scanning said image recording medium so as to produce digital data representative of contents of successive scan lines of said image recording medium;

(b) storing scanline data produced in step (a) in a digital database;

(c) processing scanline data stored in step (b) in accordance with a first image frame identification operator which identifies a location of a well formed image frame on a first portion of said image recording medium, a well formed image frame being defined as having prescribed image frame attributes including at least a spatial region of image modulation bounded by a leading edge and a trailing edge, said first image frame identification operator being operative to locate said well formed image frame irrespective of whether or not either a leading edge or a trailing image of another image frame is adjacent to said location of said well formed image frame; and (d) in response to step (c) locating said well formed image frame, processing data stored in step (b) associated with a second portion of said image recording medium, other than said first portion containing said location of said well formed image frame located by said first image frame identification operator in step (c), in accordance with a second image frame identification operator, said second image frame identification operator locating in said second portion of said image recording medium, frame regions each of which contains a first edge that is separated from either another frame edge or from a region associated with an image level that is less than a prescribed threshold and is representative of an absence of image information.

31. A method according to claim 30, wherein said leading and trailing edges of said well formed frame form respective image frame boundaries between said spatial region of image modulation and respective interframe gaps adjacent thereto.

32. A method according to claim 30, wherein said second image frame identification operator identifies, as an ambiguous region, a frame region that does not contain a first edge separated from either another edge or from a region associated with an image level that is less than a prescribed threshold and is representative of an absence of image information.

33. A method according to claim 32, further comprising the step of:

(e) processing data stored in step (b), associated with frame regions of said second portion of said image recording medium, which said second frame identification operator has identified as ambiguous, in accordance with a third image frame identification operator which identifies frame regions of said second portion of said image recording medium that are capable of spatially accommodating an integral number of image frames having a size of said well formed frame.

34. A method according to claim 33, wherein step (e) further comprises spatially subdividing a respective frame region identified by said third image frame identification operator into an integral number of tentative image frame regions and further including the step of:

(f) processing each tentative image frame region in accordance with a fourth image frame identification operator, said fourth image frame identification operator identifying an image frame region within a respective tentative image frame region having a first spatial area containing at least one scan line of image modulance, second and third spatial areas bounding said first spatial area, and having an image level less than a prescribed threshold representative of an absence of image information.

35. A method according to claim 34, further comprising the step of:

(g) processing data stored in step (b), associated with regions of said second portion of said image recording medium, which said fourth image processing operator did not identify in step (f), in accordance with a fifth image frame identification operator which identifies a frame region that contains image modulance.

36. A method according to clam 35, further comprising the step of:

(h) adjusting a region identified by said fifth image processing operator to a size of a well formed frame.

37. A method according to claim 36, wherein step (h) comprises, in response to a region identified by said fifth image processing operator being an oversized region, which exceeds a predetermined image frame size, partitioning said oversized region into a plurality of partitioned image frames each having a size of a well formed frame.

38. A method according to claim 37, wherein step (h) comprises, in response to the size of a region identified by said fifth image processing operator being an undersized region, less than a preselected frame size, combining said undersized region with another undersized region to form a combined image frame.

39. A method according to claim 30, wherein step (a) comprises translating said image recording medium with respect to an opto-electronic scanning device so as to effect a sequential scanning of said image recording medium at a prescribed scanning resolution and thereby producing said digital data respectively representative of contents of successive scan lines of said image recording medium.

40. A method according to claim 38, wherein step (b) further includes transforming data produced in step (a) into a prescribed set of predictors associated with attributes of an image frame necessary to identify where, on said image recording medium, valid image frames are located, and wherein steps (a)–(h) are carried out with respect to said prescribed set of predictors.

41. A method according to claim 40, wherein steps (c)–(h) comprise processing said predictors in accordance with a set of adaptive thresholds which are dependent upon actual scanline data within a film scan order of said image recording medium, so as to allow image frame identification operators to adjust to variations in characteristics of the image recording medium.

42. A method according to claim 41, wherein steps (c)–(h) further comprise processing said predictors in accordance with a set of non-adaptive thresholds which are independent of scanline data.

43. A method of processing an image recording medium that contains a plurality of image frames, each of said image frames having a respective location on said image recording medium, comprising the steps of:

(a) scanning said image recording medium so as to produce data representative of the contents of successive scan lines of said image recording medium;

(b) storing scanline data produced in step (a) in a digital database;

(c) processing scanline data stored in step (b) in accordance with a set of respectively different image frame identification operators, so as to identify locations of plural whole image frames of a common image frame size on said image recording medium, each respectively different image frame identification operator of said set being operative to identify a location of a whole image frame on said image recording medium in accordance with a respectively different set of spatial criteria of an image frame.

44. A method according to claim 43, wherein said set of respectively different image frame identification operators includes an image frame identification operator which identifies a well formed frame having prescribed image frame attributes that include at least a spatial region of image modulance bounded by leading and trailing edges.

45. A method according to claim 43, wherein said set of respectively different image frame identification operators includes an image frame identification operator which identifies the location of a frame region containing a first edge separated from either another edge or from a region associated with an image level that is less than a prescribed threshold representative of an absence of image information.

46. A method according to claim 45, wherein said image frame identification operator identifies, as an ambiguous region, a frame region that does not contain a first edge separated from either another edge or from a region associated with an image level that is less than a prescribed threshold representative of an absence of image information.

47. A method according to claim 43, wherein said set of respectively different image frame identification operators include an image frame identification operator which identifies frame regions that are capable of spatially accommodating an integral number of image frames having a size of a whole image frame.

48. A method according to claim 47, wherein said set of respectively different image frame identification operators is operative to spatially subdivide a respective identified frame region into an integral number of tentative image frame regions, and to identify an image frame region within a respective tentative image frame region having a first spatial area containing at least one scan line of image modulance, second and third spatial areas bounding said first spatial area and being associated with an image level less than a prescribed threshold representative of an absence of image information.

49. A method according to claim 43, wherein said set of respective different image frame identification operators includes an image frame identification operator which identifies a frame region that contains image modulance and is operative to controllably adjust an identified region to a size of a whole image frame.

50. A method according to claim 49, wherein said image frame identification operator, in response to said identified region being oversized, exceeding a predetermined image frame size, is operative to controllably partition said oversized region into a plurality of partitioned image frames each of an image frame size of said whole image frame.

51. A method according to claim 50, wherein said image frame identification operator, in response to said identified region being an undersized region, less than a preselected frame size, is operative to controllably combine said undersized region with another undersized region and thereby form a combined image frame.

52. A method according to claim 43, wherein step (b) further includes transforming data produced in step (a) into a prescribed set of predictors associated with attributes of an image frame necessary to identify where, on said image recording medium, valid image frames are located, and wherein step (c) is carried out with respect to said prescribed set of predictors.

53. A method according to claim 52, wherein step (c) comprises processing said predictors in accordance with a set of adaptive thresholds which are dependent upon actual scanline data within a film scan order of said image recording medium, so as to allow image frame identification operators to adjust to variations in characteristics of said image recording medium.

54. A method according to claim 53, wherein step (c) further comprises processing said predictors in accordance with a set of non-adaptive thresholds which are independent of the scanline data.

55. An apparatus for processing an image recording medium that contains a plurality of image frames, each of said image frames having a respective location on said image recording medium, comprising:

an image recording medium scanning device arranged to sequentially scan said image recording medium during relative translation between said image recording medium and said image recording medium scanning device, said scanning device producing a plurality of digitally encoded scan lines representative of contents of said image recording medium;

a translation device which is operative to cause relative translation between said image recording medium and said image recording medium scanning device;

a database in which scanline data representative of said plurality of digitally encoded scan lines produced by said image recording medium scanning device are stored; and a scan line processor which is operative to process said scanline data stored in accordance with a set of respectively different image frame identification operators, so as to identify locations of plural whole image frames of a common image frame size on said image recording medium, each respectively different image frame identification operator of said set being operative to identify a location of a whole image frame of said common image frame size on said image recording medium in accordance with a respectively different set of spatial criteria of an image frame.

56. An apparatus according to claim 55, wherein said set of respectively different image frame identification operators includes an-image frame identification operator which identifies a well formed frame having prescribed image frame attributes including at least a spatial region of image modulance bounded by leading and trailing edges.

57. An apparatus according to claim 55, wherein said set of respectively different image frame identification operators includes an image frame identification operator which identifies a location of a frame region containing a first or leading edge separated from either another edge or from a region associated with an image level that is less than a prescribed threshold representative of an absence of image information.

58. An apparatus according to claim 55 wherein said set of respectively different image frame identification operators includes an image frame identification operator which identifies a location of a frame region containing a second or trailing edge, that is separated from either another edge or from a region associated with an image level that is less than a prescribed threshold representative of an absence of image information.

59. An apparatus according to claim 58, wherein said image frame identification operator identifies, as an ambiguous region, a frame region that does not contain a first edge separated from either another edge or from a region associated with an image level that is less than a prescribed threshold representative of am absence of image information.

60. An apparatus according to claim 55, wherein said set of respectively different image frame identification operators includes an image frame identification operator which identifies frame regions that are capable of spatially accommodating an integral number of image frames having a size of a whole image frame.

61. An apparatus according to claim 60, wherein said set of respectively different image frame identification operators is operative to spatially subdivide a respective identified frame region into an integral number of tentative image frame regions and to identify an image frame region within a respective tentative image frame region having a first spatial area, second and third spatial areas bounding said first spatial area, and being associated with an image level less than a prescribed threshold representative of an absence of image information.

62. An apparatus according to claim 55, wherein said set of respectively different image frame identification operators includes an image frame identification operator which identifies a frame region that contains image modulance and is operative to controllably adjust an identified region to a size of a whole image frame.

63. An apparatus according to claim 62, wherein said image frame identification operator, in response to said identified region being an oversized region exceeding a predetermined image frame size, is operative to partition said oversized region into a plurality of partitioned image frames, each having an image frame size of said whole image frame.

64. An apparatus according to claim 62, wherein said image frame identification operator, in response to said identified region being undersized less than a preselected frame size, is operative to combine said undersized region with another undersized region so as to form a combined image frame.

65. An apparatus according to claim 55, wherein said processor is operative to transform scanline data produced by said an image recording medium scanning device into a prescribed set of predictors associated with attributes of an image frame necessary to identify where, on said image recording medium, valid image frames are located, and wherein said processor is operative to process said scanline data using said prescribed set of predictors.

66. An apparatus according to claim 65, wherein said processor is operative to process said predictors in accordance with a set of adaptive thresholds which are dependent upon actual scanline data within a film scan order of said image recording medium, so as to allow said image frame identification operators to adjust to variations in characteristics of said image recording medium.

67. An apparatus according to claim 66, wherein said processor is operative to process said predictors in accordance with a set of non-adaptive thresholds independent of scanline data.

68. A method of processing an image recording medium that contains a plurality of image frames, each of said image frames having a respective location on said image recording medium, comprising the steps of:

(a) scanning said image recording medium and producing digital data representative of contents of successive scan lines of said image recording medium;

(b) storing digital data produced in step (a) in an addressable digital database;

(c) processing digital data stored in step (b) in accordance with a first image frame identification operator for locating a well formed image frame, said first image frame identification operator, in response to identifying a location of a well formed image frame on said image recording medium, generating an address pointer which points to where, within said digital database, data representative of said well formed image frame is stored, said well formed image frame having prescribed image frame attributes including a first spatial region of image modulance of a prescribed well formed image frame size, that is bounded by leading and trailing edges, said lead and trailing edges of said well formed image frame demarcating respective leading and trailing image frame boundaries between said first spatial region of image modulance and respective second and third spatial regions adjacent to said first spatial region of image modulance, said second and third spatial regions being associated with an image level that is less than a prescribed threshold representative of an absence of image information;

(d) in response to step (c) locating a well formed image frame, processing digital data stored in step (b) associated with second portions of said image recording medium sequentially spaced apart from said first portion containing the location of said well formed image frame located in step (c), in accordance with a second image frame identification operator, said second image frame identification operator being operative to identify additional image frames within said second portions of said image recording medium in accordance with whether within said second portions of said image recording medium contain at least one but less than all of said prescribed image frame attributes and, in response to identifying a location of an additional image frame within said second portions of said image recording medium, generating a respective address pointer which points to where, within said digital database, data representative of said additional image frame is stored;

(e) repeating step (d) for said second portions of said image recording medium until said second image frame identification operator no longer locates additional image frames, and then repeating steps (c)–(e) for the entirety of said image recording medium until the entirety of said image recording medium has been subjected to steps (c)–(e);

(f) establishing parameters for a standard image frame size in accordance with parameters of said well formed image frame and additional image frames located in steps (c)–(e); and (g) using the parameters for a standard image frame size established in step (f), processing digital data stored in step (b) that is associated with third portions of said image recording medium where steps (c)–(e) failed to locate a well formed image frame or one or more additional image frames, in accordance with a third image frame identification operator, said third image frame identification operator being operative to locate further image frames in said third portions of said image recording medium in accordance with a prescribed relationship between said standard frame size and said third portions of said image recording medium.

69. A method according to claim 68, further comprising the step of:

(h) adjusting, as necessary, the size of each of said whole image frame, said additional image frames and said further image frames to conform with a predetermined image frame size.

70. A method according to claim 68, wherein said third image frame identification operator is operative, in response to said third portions of said image recording medium containing a region of at least said standard frame size and containing image modulance, to subdivide from said region one or more of said further image frames.

71. A method according to claim 70, wherein said third image frame identification operator is further operative, in response to said third portions of said image recording medium containing multiple regions less than said standard frame size and containing image modulance, to combine plural ones of said multiple regions into one or more of said further image frames.

72. A method according to claim 71, further comprising the step of:

(h) adjusting, as necessary, the size of each of said further image images to conform with a predetermined image frame size.

73. A method according to claim 68, wherein said third image frame identification operator is operative, in response to said third portions of said image recording medium containing multiple regions less than said standard frame size and containing image modulance, to combine plural ones of said multiple regions into one or more of said further image frames.

* * * * *